US010372772B2

United States Patent
Brodie et al.

(10) Patent No.: US 10,372,772 B2
(45) Date of Patent: *Aug. 6, 2019

(54) PRIORITIZING MEDIA BASED ON SOCIAL DATA AND USER BEHAVIOR

(71) Applicant: Microsoft Technology Licensing, LLC, Redmond, WA (US)

(72) Inventors: Alexander S. Brodie, Redmond, WA (US); Chunkit Jacky Chan, Redmond, WA (US); David J. Lee, Redmond, WA (US); Stacia L. C. Scott, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,390

(22) Filed: Mar. 14, 2018

(65) Prior Publication Data

US 2018/0203937 A1 Jul. 19, 2018

Related U.S. Application Data

(63) Continuation of application No. 14/332,310, filed on Jul. 15, 2014, now Pat. No. 9,953,086.

(51) Int. Cl.
*G06F 16/30* (2019.01)
*G06F 16/9535* (2019.01)
(Continued)

(52) U.S. Cl.
CPC ........ *G06F 16/9535* (2019.01); *G06F 16/148* (2019.01); *G06F 16/168* (2019.01)

(58) Field of Classification Search
CPC ............. G06F 17/30867; G06F 16/148; G06F 16/168; G06F 16/9535
(Continued)

(56) References Cited

U.S. PATENT DOCUMENTS 8,312,140 B2  11/2012  Zuckerberg et al.
8,484,224 B1   7/2013  Harris et al.
(Continued)

FOREIGN PATENT DOCUMENTS

GB       2507036 A      4/2014
WO    2009070841 A1    6/2009

OTHER PUBLICATIONS

"Customizing PubMed Using My NCBI: Setting up E-Mail Alerts", Retrieved From: <<http://uscm.med.sc.edu/tutorials/myncbialerts.pdf>>, May 2013, 2 Pages.
(Continued)

*Primary Examiner* — Mahesh H Dwivedi
(74) *Attorney, Agent, or Firm* — Arent Fox LLP

(57) ABSTRACT

Media files may be prioritized based on user behavior data and social data associated with individual media files. A process of prioritizing media files may include accessing user behavior data associated with individual media files in a set of media files that are stored on a client device of a user or in a cloud-based storage location associated with the user, accessing social data associated with one or more media files of the set of media files that are determined to have been shared on a media file sharing service, and ranking the set of media files based at least in part on the user behavior data and the social data.

20 Claims, 8 Drawing Sheets

(51) Int. Cl.
*G06F 16/14* (2019.01)
*G06F 16/16* (2019.01)

(58) Field of Classification Search
USPC ........................................................ 707/723
See application file for complete search history.

(56) References Cited

U.S. PATENT DOCUMENTS

| | | | |
|---|---|---|---|
| 8,577,868 | B1 | 11/2013 | Zamir et al. |
| 2006/0242139 | A1 | 10/2006 | Butterfield et al. |
| 2008/0005120 | A1 | 1/2008 | Li |
| 2008/0208922 | A1 | 8/2008 | Wolas-shiva et al. |
| 2008/0243837 | A1 | 10/2008 | Davis et al. |
| 2008/0281817 | A1* | 11/2008 | White ............... G06F 17/30867 |
| 2008/0288629 | A1 | 11/2008 | Fisher et al. |
| 2008/0306931 | A1 | 12/2008 | Brower et al. |
| 2011/0235088 | A1 | 9/2011 | Luo |
| 2011/0314039 | A1 | 12/2011 | Zheleva et al. |
| 2012/0215771 | A1 | 8/2012 | Steiner |
| 2013/0061296 | A1 | 3/2013 | Reddy et al. |
| 2014/0046955 | A1 | 2/2014 | Dollard |
| 2014/0181090 | A1 | 6/2014 | Homsany |
| 2014/0244386 | A1 | 8/2014 | Mathur |

OTHER PUBLICATIONS

"Final Office Action Issued in U.S. Appl. No. 14/332,310", dated Aug. 7, 2017, 77 Pages.

"Final Office Action Issued in U.S. Appl. No. 14/332,310", dated Nov. 10, 2016, 65 Pages.

"Non-Final Office Action Issued in U.S. Appl. No. 14/332,310", dated Jul. 26, 2016, 50 Pages.

"Non-Final Office Action Issued in U.S. Appl. No. 14/332,310", dated Mar. 6, 2017, 77 Pages.

Claypool, et al., "Inferring User Interest", In Journal of IEEE Internet Computing, vol. 5, Issue 6, Nov. 2001, 17 Pages.

Henry, Alan, "Five Creative Uses for Google Alerts", Retrieved From: <<https://lifehacker.com/five-creative-uses-for-google-alerts-475278626>>, Apr. 18, 2013, 10 Pages.

Kelly, et al., "Implicit Feedback for Inferring User Preference: A Bibliography", In ACM Special Interest Group on Information Retrieval Forum, vol. 37, Issue 2, Jan. 1, 2003, pp. 18-28.

"International Preliminary Report on Patentability Issued in PCT Application No. PCT/US2015/039846", dated Sep. 27, 2016, 10 Pages.

"International Search Report & Written Opinion Issued in PCT Application No. PCT/US2015/039846", dated Oct. 2, 2015, 13 Pages.

"Second Written Opinion Issued in PCT Application No. PCT/US2015/039846", dated May 31, 2016, 8 Pages.

Steiner, Thomas, "A Meteoroid on Steroids: Ranking Media Items Stemming From Multiple Social Networks", In Proceedings of the 22nd International Conference on World Wide Web Companion, May 13, 2013, pp. 31-33.

Trevisiol, et al., "Image Ranking Based on User Browsing Behavior", In Proceedings of the 35th International ACM Special Interest Group on Information Retrieval Conference on Research and Development in Informational Retrieval, Aug. 12, 2012, pp. 445-454.

Zhao, et al., "On the Annotation of Web Videos by Efficient Near-Duplicate Search", In IEEE Transactions on Multimedia, vol. 12, Issue 5, May 18, 2010, pp. 448-461.

"Office Action Issued in European Patent Application No. 15742454.0", dated May 6, 2019, 10 Pages.

* cited by examiner

US 10,372,772 B2

PRIORITIZING MEDIA BASED ON SOCIAL DATA AND USER BEHAVIOR

RELATED APPLICATION(S)

This application is a continuation of U.S. patent application Ser. No. 14/332,310, entitled "PRIORITIZING MEDIA BASED ON SOCIAL DATA AND USER BEHAVIOR" and filed on Jul. 15, 2014, which is expressly incorporated by reference herein in its entirety.

BACKGROUND

With advancements in digital media capture and storage technology, it has become much easier for the average user to create and store media files (e.g., digital images, videos, sound clips, etc.). To this end, today's average user takes several pictures a day on her smart phone, whether she does so to capture a memorable moment, like a picture of her child, or to remember the parking stall number where she parked her car. Users also tend to keep most, if not all, of the digital media files that they create or otherwise obtain (e.g., download) primarily because there are no practical constraints on the amount of available storage space. Moreover, the introduction of web-based storage services (often referred to as "cloud" storage services) has made it even easier for users to store massive collections of media files in "the cloud" where storage space is even less of a concern as compared to personal storage devices.

However, as the number of media files in a given collection grows, it becomes difficult to find the most important media file(s) within the collection. In general, large media file collections are unmanageable due to the fact that organizational schemes offer little more than arranging media files by creation date. Consequently, users have to sort through a large number of "unimportant" media files to locate the important media files in their personal collection. This process of locating important media files is inefficient and otherwise time consuming, leading to poor user experience and the potential to overlook media files that are of interest to the user.

SUMMARY

Described herein are techniques and systems for prioritizing media files in a personal collection based at least in part on a combination of user behavior data and social data. Prioritizing media files in this manner allows for surfacing, or otherwise presenting, the most important media files in a collection that are likely to be the most interesting media files from the perspective of the user that maintains the personal collection.

In some embodiments, a computer-implemented process of prioritizing media files may include accessing behavior data of a user, the behavior data associated with individual media files in a set of media files that are stored on a client device of the user or in a cloud-based storage location associated with the user, accessing social data associated with one or more media files of the set of media files that are determined to have been shared on a media file sharing service, and ranking the set of media files based at least in part on the behavior data and the social data.

In some embodiments, a computer-implemented process of collecting social data associated with a media file in a user's collection of media files includes comparing information associated with the media file to information associated with individual media files in a set of media files that have been shared to a website of a media file sharing service, identifying a copy of the media file in the set of media files based at least in part on the comparing, and receiving social data associated with the copy from the media file sharing service.

By leveraging both user behavior data representing a user's interactions with media files and social data that is collected from a media file sharing service, the media files within a collection that receive the highest occurring, and the most meaningful and relevant, local interactions and social interactions may be surfaced from the collection as the most important media files without the user having to sort through media files that are less important. It is expected that, within a large collection of media files (e.g., images), the most important photos will conspicuously "surface" using the techniques and systems disclosed herein because media files (e.g., images) that are viewed and edited more, tend to be the same media files that are shared more often, and the media files that are shared will be interacted with by a user community as opposed to those media files that are not shared.

Additionally, social data may be leveraged without monitoring all sharing activity occurring at the client computing device of the user. That is, the techniques and systems disclosed herein do not need to know which media files are shared at the time that they are shared from a client computing device. Instead, the system accesses one or more media file sharing services to find one or more shared media files that match individual media files in the personal collection of the user. In this manner, social data associated with media files of a personal collection may be gathered from one or multiple media file sharing sites to augment the prioritization process in regard to a personal media file collection.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Embodiments of the present disclosure are directed to, among other things, techniques and systems for prioritizing media files in a personal collection based at least in part on a combination of user behavior data and social data associated with individual media files. The techniques and systems described herein may be implemented in a number of ways and may be utilized for prioritizing any type of media file in a media file collection. For illustrative purposes, media files are often described as digital images herein. However, it is to be appreciated that the techniques and systems disclosed herein may be used to prioritize any suitable type of media file, singularly or in combination with other types of media files. A non-exhaustive list of media file types contemplated herein includes images (e.g., photographs), videos, graphics, animation, audio, text (e.g., documents), interactive media, or any other suitable type of media file, or combinations (i.e., multimedia) thereof. Thus, the techniques and systems described herein are not limited to prioritization of digital images.

Example Architecture

Figure 1:
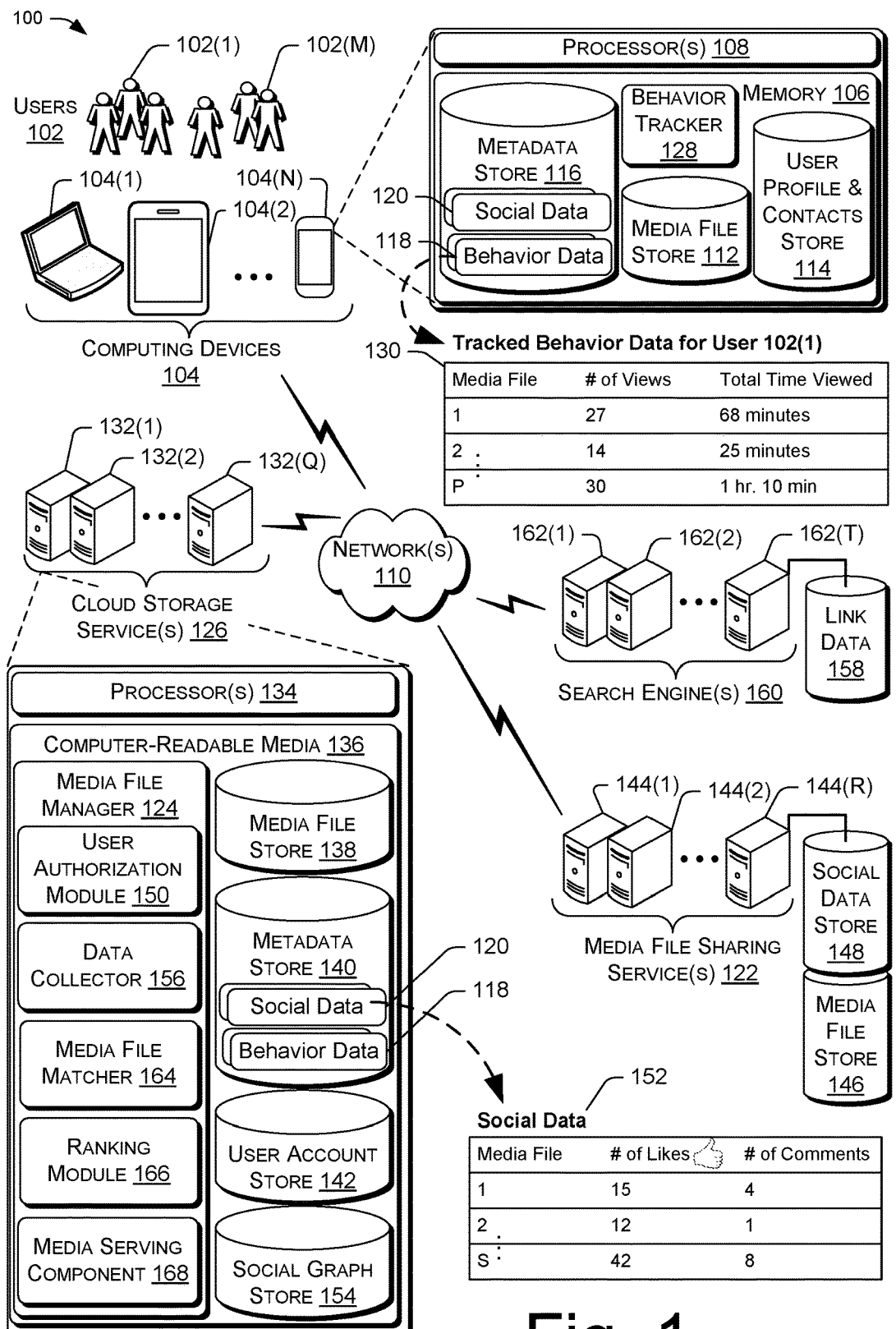
FIG. 1 is a schematic diagram of an example architecture for prioritizing media files in a personal collection based on user behavior data and social data.

FIG. 1 is a schematic diagram of an example architecture 100 that is usable to enable users 102(1), . . . , 102(M) (collectively 102) operating respective computing devices 104(1), . . . , 104(N) (collectively 104, and sometimes referred to as "client" computing devices, or "local" computing devices) to engage in creating/obtaining, storing, and otherwise managing media files as part of a personal collection of media files, such as a personal collection of digital images. The architecture 100 is merely one example, and the techniques described herein are not limited to performance using the architecture of FIG. 1, nor are they limited to digital images as a media file type, as mentioned above.

Within the architecture 100, the users 102, in some instances, may operate the computing devices 104 to create media files. For example, the computing devices 104 may include, or may be connectable to, one or more media capture components (e.g., a camera(s), a microphone(s), etc.) for capturing data (e.g., still image data, video data, audio data, etc.) and storing in memory 106 the captured data digitally in media file format. As another example, the users 102 may create or modify media files using one or more content creation programs (e.g., a drawing program like Microsoft Paint®) that are stored on the computing devices 104.

Additionally, or alternatively, the users 102 may operate the computing devices 104 to cause one or more processors 108 of the computing device 104 to access and obtain (e.g., download) media files over a network 110. For example, the users 102 may access a content provider website from which the users 102 can download media files and store them in the memory 106.

Accordingly, media files (whether they are created using media capture components and/or programs of the computing device 104, or downloaded over the network 110) may be stored in a media file store 112, which is shown to be included in the memory 106 of the computing device 104. In this scenario, the media files collected by a user 102(1) and stored in the media file store 112 may represent the user's own personal collection of media files.

The computing devices 104 may be implemented as any type of computing device including, but not limited to, personal computers, laptop computers, tablet computers, portable digital assistances (PDAs), mobile phones (e.g., smart phones), digital cameras, wearable computers (e.g., smart watches), set-top boxes (STBs), game consoles, electronic book readers, and so forth. In some embodiments, the memory 106 of the computing devices 104 may further include a user profile and contacts store 114 for storing user profiles of the users 102 who operate the computing devices 104, as well as contacts of those users 102. In this scenario, the users 102 may each be able to log/sign into respective user profiles so that the identity of each user 102 may be determined by the computing device 104. In some embodiments, a default user profile may be invoked upon a user 102 starting up, or otherwise operating, the computing device 104. Moreover, the user profiles may represent individual ones of the users 102 and/or groups of users 102. For example, a shared, family computing device 104 may store a "family" profile for a group of users 102 comprising, for example, a mother, father, son, and daughter. The contacts maintained in the user profile and contacts store 114 may be associated with corresponding contact information, such as one or more phone numbers, email addresses, social networking account names, etc.

The memory 106 of the computing devices 104 may further include a metadata store 116 to store metadata associated with the media files in the media file store 112. The metadata may include a variety of information including, but not limited to, timestamp information indicating when a media file was created, captured, or modified, geolocation information pertaining to a geographical location where a media file was created, tags that describe people included in or otherwise associated with the media file, properties of the media file (e.g., in the context of images/video—resolution, contrast, aspect ratio, frame rate, etc.), user behavior data 118 pertaining to interactions between the users 102 and media files, social data 120 of social interactions between the users 102 and the media files as they occurred on one or more a media file sharing services 122, and similar metadata. Metadata in the form of the user behavior data 118 and the social data 120 will be described in more detail below, but both forms of metadata generally represent data relating to past user interactions with the media files in the media file store 112, and when this metadata is associated with individual media files, the metadata are definable as characteristics of each individual media file by which a set of media files may be prioritized.

In the illustrated example of FIG. 1, a media file manager 124 of a cloud storage service(s) 126 may operate in conjunction with a client-side application (e.g., a native application integrated in the operating system of the computing device 104, an application downloaded to the computing device 104, a browser of the computing device 104, etc.) to allow for presenting at least a subset of the media files in the media file store 112 in a manner that highlights the most important media files in a personal collection. For instance, a subset of the most important images in a personal collection of images stored in the media file store 112 may be highlighted by presenting those images via a user interface (UI) of the computing device 104. The important media files may be determined from a variety of characteristics about the media files, including at least the aforementioned user interaction characteristics in the form of the user behavior data 118 and the social data 120. Details surrounding the user behavior data 118 and the social data 120, as well as the manner of collecting and using this metadata, will now be described.

A behavior tracker 128 may be stored in the memory 106 and executable on the one or more processors 108 of the computing device 104 to track one or more behaviors of the users 102 (i.e., each user's interactions with individual media files) to obtain the user behavior data 118. For instance, each user 102 may provide user input to the computing device 104 (e.g., using a mouse or another pointing device, touch screen input, voice input, etc.) to cause operations to be performed on the computing device 104 with respect to individual media files. For example, a user 102 may open a media file by providing touch-based input to a display of the computing device 104, and may edit the media file using a media file editing program or application on the computing device 104. The behavior tracker 128 may integrate with any application or program on the computing device 104 that allows for user interaction with media files (e.g., an image viewer/editing application), and such an application or program may be a native application built into the operating system of the computing device 104, or a standalone, aftermarket application downloaded over the network 110.

Additionally, or alternatively, the behavior tracker 128 may be configured to track user interactions with media files stored on other storage devices and locations across the network 110. For example, the behavior tracker 128 may be configured to track user interactions with the media files in the cloud, such as the media files stored in the cloud-based media file store 138. That is, the behavior tracker 128 may track user interactions with the media files in the cloud-based media file store 138 when a user invokes a web browser or similar application to view, edit, or otherwise interact with media files in the cloud. In this sense, the behavior tracker 128 may be implemented to track user behaviors across a variety of devices, applications, and services, whether they reside on the client devices 104 or in the cloud storage service(s) 126. In some embodiments, an application programming interface (API) between two applications or programs may allow for the behavior tracker 128 to monitor and track user interactions via multiple programs on a computing device, such as the computing device 104.

In this manner, the user behavior data 118 may be aggregated from multiple applications and services, potentially across a plurality of client computing devices 104 and user interactions occurring via the cloud storage service(s) 126. As such, this user behavior data 118 that is tracked by the behavior tracker 128 for each user 102 may include, without limitation, interactions with locally stored media files performed by specific users or groups of users, e.g., an amount of time individual media files have been viewed, a number of times or frequency that individual media files have been viewed, a number of times or frequency that individual media files have been opened, a number of times or frequency that individual media files have been "clicked" upon (as distinguished from opening the media file), a number of times or frequency that individual media files have been edited, an extent to which individual media files have been edited, time spent editing individual media files, a number of times or frequency that individual media files have been "zoomed in on" while being viewed, a number of times or frequency that individual media files have been shared, tags (e.g., names, keywords, ratings, etc.) added to the individual media files, a number of pauses, playbacks, rewinds, and/or fast-forward commands performed on playable media files (e.g., videos, animations, etc.), searching or browsing data, e.g., search terms used in executing queries against the media files and the particular media files returned for the search terms, filters applied against the media files and the particular media files remaining after the filtering, events associated with a time and/or location during interaction with the media file, and so on. Since the users 102 often exhibit some or all of the aforementioned behaviors for media files that they prefer, tracking this behavior using the behavior tracker 128 facilitates understanding of which media files are more important to the users 102. Furthermore, because user behaviors are personal to each of the users 102 (i.e., different users will interact often with, and prefer, different media files), the user behavior data 118 tracked for each user 102 is unique to each user, offering prioritized rankings of media files that are customizable to each user 102. In this manner, each individual media that receive local user interactions may be characterized by those interactions, and those interactions may be broken-down per user 102. Table 130 illustrates example user behavior data 118 tracked for the user 102(1) in association with the media files 1-P. In this example, Table 130 shows the number of times that the user 102(1) has viewed each of the media files 1-P, and the total time that each of the media files 1-P have been viewed by the user 102(1).

In addition to storing media files of a personal collection in the media file store 112 of the computing device 104, the users 102 may utilize one or more of the aforementioned cloud storage services 126 (or file hosting services) to store media files of their personal collection "in the cloud." One illustrative cloud storage service 126 that is suitable for use with the embodiments disclosed herein is OneDrive™, commercially available from Microsoft® Corporation of Redmond, Wash. The users 102 may access the cloud storage service(s) 126 via the computing devices 104 over the network 110 for accessing, storing, and otherwise managing their personal collection of media files. As such, the network 110 may represent any one or combination of multiple different types of wired and/or wireless networks, such as cable networks, the Internet, local area networks, mobile telephone networks, wide area networks, or a combination of such networks.

The cloud storage service(s) 126 may be implemented as one or more servers 132(1), 132(2) . . . , 132(Q) (collectively 132), perhaps arranged in a cluster or as a server farm, to host storage services for media files of the users 102. Other server architectures may also be used for the cloud storage service(s) 126. In the illustrated implementation, the server(s) 132 are shown to include one or more processors 134 and one or more forms of computer-readable media 136. The server(s) 132 may also include additional data storage devices (removable and/or non-removable) such as, for example, magnetic disks, optical disks, or tape. Such additional storage may include removable storage and/or non-removable storage. Computer-readable media 136 may include, at least, two types of computer-readable media 136, namely computer storage media and communication media. Computer storage media may include volatile and nonvolatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other non-transmission medium that may be used to store the desired information and which may be accessed by the server(s) 132. Any such computer storage media may be part of the server(s) 132. Moreover, the computer-readable media 136 may include computer-executable instructions that, when executed by the processor(s) 134, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The one or more processors 134 may be implemented in hardware or software, or a combination of both. Examples of hardware processors include, without limitation, a hardware central processing unit (CPU), a field programmable gate array (FPGA), a complex programmable logic device (CPLD), an application specific integrated circuit (ASIC), a system-on-chip (SoC), and the like.

In some embodiments, the cloud storage service(s) 126 maintains media files within a cloud-based media file store 138. In general, data synchronization may occur between the computing devices 104 and the cloud storage service(s) 126 such that media files that are added to the local media file store 112 get replicated in the cloud-based media file store 138 to persist a personal media file collection between the local media file store 112 and the cloud-based media file store 138 to maintain consistency between the multiple storage locations. The data synchronization process may occur "in the background," such as periodically, when network availability and bandwidth allow for synchronization to occur. In addition, the data synchronization may be one-way or two-way synchronization between the cloud storage service(s) 126 and the computing devices 104. In this manner, the media file collection stored in the local media file store 112 may overlap with the media file collection stored in the cloud-based media file store 138, but they may not be identical collections at all times. For example, when a user 102(1) adds one or more new media files to the local media file store 112, and at a time before the aforementioned synchronization occurs, the newly added media file(s) would not be replicated in the cloud-based media file store 138. However, once the synchronization occurs, the newly added media file(s) may be replicated to the cloud-based media file store 138. The user 102(1) may alternatively delete one or more media files in the local media file store 112 such that, before synchronization occurs, the deleted media file(s) may be stored in the cloud-based media file store 138, but not in the local media file store 112.

The computer-readable media 136 may further include a metadata store 140 to store metadata associated with the media files in the media file store 138. The metadata may include the same, or at least similar, types of metadata as the types described above with reference to the local metadata store 116. For example, the metadata store 140 may include the user behavior data 118 and the social data 120, and this metadata may generally be synchronized between the cloud storage service(s) 126 and the computing devices 104 in the same manner that the media files are synchronized between the multiple storage locations. For example, as the behavior tracker 128 tracks user behavior on the local computing device 104, the behavior data 118 initially stored in the local metadata store 116 is subsequently replicated in the behavior data 118 within the cloud-based metadata store 140 upon synchronization. In this manner, data (i.e., media files and their associated metadata) may be replicated between the computing devices 104 and the cloud storage service(s) 126 in an ongoing manner as part of a background synchronization process to ensure that the media files and associated metadata are kept up-to-date in a consistent manner between the multiple storage locations.

The computer-readable media 136 may further include a user account store 142 that maintains a plurality of user accounts associated with the users 102 so that each of the users 102 that enlist the cloud storage service(s) 126 may be identified and allocated a portion of the storage space available from the cloud storage service(s) 126. The user account store 142 may include user authentication information (e.g., user name and password), so that the users 102 may log/sign into her respective user account when she desires to view or otherwise manage the media files stored in the media file store 138. For example, a user 102 may point a web browser on the computing device 104 to a web address of the cloud storage service(s) 126 to view/manage their personal collection of media files stored in the media file store 138.

In some embodiments, the users 102 may periodically share or post media files to the one or more media file sharing services 122, which may be implemented as one or more servers 144(1), 144(2) ..., 144(R) (collectively 144), perhaps arranged in a cluster or as a server farm, to host media file sharing services for media files that the users 102 desire to share. The media file sharing service(s) 122 may represent a social networking service (e.g., Facebook®, Twitter®, etc.) or any other type of file sharing service (e.g., Flickr®, SmugMug®, Dropbox®, etc.) where the users 102, as a community, may share or otherwise post media files to the media file sharing service(s) 122, which maintains shared media files in a media file store 146 in association with user/social profiles of the users 102. The community of the users 102 that have user/social profiles with the media file sharing service(s) 122 may interact with the media files posted from the community by, for example, "liking" media files, commenting on media files, tagging people in the shared media files, and so on. When a user 102(1) interacts with a shared media file via the media file sharing service(s) 122, the media file sharing service 122 may store those user interactions within a social data store 148. For example, when the user 102(1) "likes" a digital image shared by another user 102(M), that "like" may get associated with the digital image in the social data store 148. In this manner, a wealth of social data 120 may be gathered and maintained by the media file sharing service 122, and ultimately collected within the cloud-based metadata store 140.

The social data 120 that is collected from the media file sharing service 122 and stored in the cloud-based metadata store 140 may include, without limitation, interactions with the media files, such as social media approvals or disapprovals of the media files, e.g., a number of times or frequency that individual media files have been "liked" (thumbs up) or "disliked" (thumbs down) or marked as a favorite, comment data, e.g., a number of times or frequency that individual media files have been commented on, a number of unique users that have commented on individual media files, tags (e.g., people, keywords, ratings, etc.) added to individual media files, network effects, such as a number of times or frequency that individual media files have been re-shared (e.g., shared, posted, blogged, microblogged, etc.), a number of times or frequency that individual media files have been recommended, identities of users that have interacted with individual media files, an amount of time that the users 102 spent viewing individual media files, a number of times or frequency that individual media files have been viewed, a number of times or frequency that individual media files have been clicked-on, a number of times or frequency that individual media files have been "zoomed in on" while being viewed, text within comments associated with individual media files, events associated with a time and/or location during interaction with the media file, and so on. As such, individual media files may be characterized by these social interactions, and the social data 120 may be utilized to influence prioritization of the media files accordingly.

As mentioned above, the media file manager 124 is configured to manage the media files in a user's personal collection by prioritizing media files for presentation. In some embodiments, the media file manager 124 includes a user authorization module 150 to obtain user authorization for various purposes in the context of collecting user-specific data and using that data for prioritization of media files. The user authorization module 150 may prompt the users 102 for their consent via an on-screen prompt on the computing device 104, or via a end-user license agreement associated with the media file manager 124. For example, the user authorization module 150 may ask for the permission of a user 102(1) to track her behavior on the computing device 104 in regards to the user's interaction with the media files in the media file store 112. Upon receiving the user's consent to do so, the behavior tracker 128 may be initiated on the computing device 104 for tracking the user behavior data 118. Similarly, the user authorization module 150 may ask the users 102 for authorization to access their user/social profiles on the media file sharing service(s) 122 for purposes of collecting the social data 120 over the network 110. Upon receiving user authorization to do so, the social data 120 may be obtained over the network 110 by the cloud storage service(s) 126.

In some embodiments, this transmission of the social data 120 may be implemented via push notifications where, upon a user 102 interacting with a media file on the media file sharing service(s) 122, a notification of that interaction may be pushed to the cloud storage service(s) 126 and stored in the metadata store 140 as the social data 120. This social data 120 may also be associated with the same media file as the shared media file, which may be replicated in the cloud-based media file store 138. Additionally, or alternatively, data may be pulled from the media file sharing service(s) 122, such as periodically, to determine if any shared media files have been interacted with on the media file sharing service(s) 122, and if so, that data may be pulled to the cloud storage service(s) 126 and stored in the cloud-based metadata store 140 in association with the corresponding media file. Table 152 illustrates example social data 120 collected from the media file sharing service(s) 122 in association with the media files 1-S. In this example, Table 152 shows the number of "likes" received on each of the media files 1-S, and the number of comments received on each of the media files 1-S.

The user authorization module 150 may further ask the users 102 for permission to access social graph data via their user/social profiles on the media file sharing service(s) 122, and to store the social graph data in the social graph store 154. Social graph data may pertain to the connections or relationship information established for any given user 102 on the media file sharing service(s) 122. For example, connections in the social graph data may represent explicit social connections, such as "friends" of the user 102 specified on the media file sharing service(s) 122. Connections may be hierarchical in nature to specify varying levels of connectedness, such as friends, family, coworkers, etc. Other implicit connections may be derived from the media file sharing service(s) 122 and/or the computing devices 104 and stored as part of the social graph data in the social graph store 154. For example, other users 102 that a user 102(1) interacts with on the media file sharing service(s) 122, such as writing to the other users 102 walls, interacting with media files shared by the other users 102, and so on, may be considered as implicit "connections" despite a lack of an explicit connection, such as a "friend" relationship. As another example, information regarding contacts in the user profile and contacts store 114 that the user has emailed, called, texted, or otherwise communicated with in the past may be imported to the social graph store 154 and considered by the media file manager 124. In this manner, any given user 102 may be connected in a variety of different ways to other users 102 in the community of users 102, and these connections may be represented in the social graph store 154.

In some embodiments, the media file manager 124 further includes a data collector 156 to collect various types of data used in prioritizing media files as disclosed herein. For example, the data collector 156 may receive the social data 120 via push notifications from the media file sharing service(s) 122 for storage in the metadata store 140. Alternatively, the data collector 156 may periodically pull updates from the media file sharing service 122 to collect the social data 120. In general, the data collector 156 may aggregate various types of data from any number of sources that provide the data so that it may be analyzed and used as part of the prioritization process disclosed herein. In some embodiments, the data collector 156 may be further configured to collect link data 158 from one or more search engine(s) 160, which may be implemented as one or more servers 162(1), 162(2) . . . , 162(T) (collectively 162), perhaps arranged in a cluster or as a server farm. Specifically, the search engine(s) 160 may index publicly shared media files in terms of the number of websites that point to each media file. The number of websites (or links) may be stored as the link data 158 (or "PageRank" data). The link data 158 may be used to influence the prioritization of media files. It is contemplated that the data collector 156 may collect any other suitable type of data from any suitable data source accessible over the network 110.

In a similar fashion to how the user behavior data 118 is tracked on the computing devices 104 and replicated in the cloud-based metadata store 140, the data (e.g., the social data 120, link data 158, etc.) collected by the data collector 156 may be replicated periodically in the local metadata store 116 through the aforementioned background synchronization process that may run in the reverse direction from the cloud storage service(s) 126 to the computing devices 104. In this manner, metadata associated with the media files in a personal collection may be kept up-to-date for consistency between the multiple storage locations.

In some embodiments, the media file manager 124 may further include a media file matcher 164 to find those media files stored in the media file store 146 of the media file sharing service(s) 122 that match individual media files stored in the cloud-based media file store 138. By matching media files between the cloud storage service(s) 126 and the media file sharing service(s) 122, the cloud storage service(s) 126 may be able to determine which of the media files in a user's personal collection have been shared to the media file sharing service(s) 122 without having to monitor all sharing activity as it occurs via the computing device 104 of the user 102. This approach to finding shared media files in one's personal collection considers the fact that media files can be shared in many different ways via the computing device 104. For example, a user 102(1) may share a digital image via a photo viewer application on the computing device 104, a social networking application on the computing device 104, a browser executed on the computing device 104 that points to a website of the media file sharing service(s) 122, and so on. Rather than attempting to monitor which files are shared via the computing device 104 at the time that they are shared, the media file matcher 164 is configured to determine the files that have been shared on the "back end." Once a matched set of media files is determined, the social data 120 associated with the individual matched media files may be collected and stored in the cloud-based metadata store 140.

The media file matcher 164 may utilize any suitable technique or criteria for determining whether two media files match. In some embodiments, a duplicate detection algorithm may be utilized by the media file matcher 164 that uses a similarity metric to determine whether two media files are matching. In the digital image context, this may involve image analysis techniques where two digital images are analyzed for similar visual features or saliency (i.e., pixel data). In some embodiments, feature vectors may be generated for each image, and corresponding hash codes may be created that are comparable between images for judging similarity. In the audio file context, audio analysis techniques may be used to detect similar sound-based features (e.g., sound waves, pitch, amplitude, etc.). In yet other embodiments, metadata of two media files may be compared to determine a match. Again, in the context of digital images, a camera serial number, time data, and/or geolocation data may be compared to determine whether there is a match between the compared metadata for determining whether corresponding media files match.

After data collection, prioritization of media files in a personal collection may be performed by a ranking module 166, and at least a subset of those ranked media files may ultimately be served or otherwise presented via displays of the computing devices 104 by a media serving component 168. The ranking module 166 is configured to prioritize (triage or rank) media files in the personal collections of the users 102 for presentation on the client devices 104 by considering a variety of factors and characteristics of the media files within the personal collection. For instance, the ranking module 166 may consider quality metrics (e.g., resolution, color, etc.) associated with media files to highlight (e.g., present more often or present first) images with high quality, diversity indicators to highlight a diverse set of images, and/or user interaction characteristics embodied in the social data 120 as described above, among other factors and characteristics that may influence prioritization. The user interaction characteristics may include at least a consideration of both user behaviors embodied in the user behavior data 118 and user interactions from a community of users 102, as well as the current state of relationship between the user 102 and the other users 102 in the community contributing to the social data 120. In this manner, the ranking for any given media file with respect to any given user 102 may change over time as more user interactions with that media file occur.

In some embodiments, the ranking module 166 may access the user behavior data 118 and the social data 120 that characterize the individual media files so that the media files may be prioritized/ranked according to these user interaction characteristics. The various types of user behaviors and social interactions may be evenly weighted, or they may be assigned different weights (i.e., weighted unevenly) and/or normalized to avoid outliers. Considering digital images as an illustrative media file example, the ranking module 166 may consider the following types of user behavior data 118: (i) the number of times a user 102(1) has viewed individual digital images, and (ii) the total time that the user 102(1) spent viewing the individual digital images. The ranking module 166 may further consider the following types of social data 120: (iii) the number of "likes" associated with the individual digital images, and (iv) the number of comments associated with the individual digital images. In a simple example, these four user interaction characteristics associated with the digital image may be used to rank the media files in order by the highest to lowest occurring statistics in aggregate among the four characteristics. For example, a digital image that outscores all of the other images in a personal collection in terms of the number of times the user 102(1) spent viewing the digital image, the time she spent viewing it, and the number of "likes" and comments the digital image received on a media file sharing service(s) 122, would rank the highest among the digital images in a personal collection.

In other embodiments, ranking strategies that weigh certain user behaviors and social interactions more heavily than others may be employed. In this manner, weights may be chosen based on the importance and/or significance of the respective user behavior or social interaction, and the media files may be ranked and presented based on their importance to a user 102 using the weights. In this sense, the ranking module 166 may consider different weights for respective user behaviors and social interactions embodied in the user behavior data 118 and the social data 120, respectively, to provide differing ranking approaches or strategies where certain behaviors and interactions have more or less influence on the prioritization of the media files.

In some embodiments, different ranking approaches/strategies may be employed on a per-user basis that are catered to individual users 102 or groups of the users 102. For example, a first user 102(1) may be presented with media files predominantly organized based on how often those media files have been edited by the first user 102(1) by weighting user behaviors relating to editing media files more than weights associated with other user behaviors. The selection of these weights may be determined by looking at a history of user behaviors specific to the first user 102(1) and analyzing the user behaviors to determine that the first user 102(1) edits media files more often than any other type of user behavior tracked by the behavior tracker 128. Meanwhile, a second user 102(M) may be presented with media files predominantly organized based on how often those media files have been shared by the second user 102(M) by weighting user behaviors relating to sharing media files more than weights associated with other user behaviors. The selection of these weights may be determined by looking at a history of user behaviors specific to the second user 102(M) and analyzing the user behaviors to determine that the second user 102(M) shares media files more often than any other type of user behavior tracked by the behavior tracker 128. That way, the media files highlighted for the first user 102(1) will be those media files that are more important to the first user 102(1) because she has historically edited them more often, with higher frequency, or for longer periods of time relative to other media files. In comparison, the media files highlighted for the second user 102(M) will be those media files that are important to the second user 102(M) because she has historically shared them more often or with higher frequency relative to other media files.

In some embodiments, the ranking module 166 facilitates prioritization of media files using machine learning models to determine correlations between importance of individual media files to particular users 102 and user interactions (i.e., user behaviors and social interactions) associated with those media files. In some embodiments, users 102 may provide feedback to the media file manager 124 to validate whether prioritized media files are important to the users 102, and the ranking module 166 may learn from this data to implement a ranking approach/strategy that considers the most influential user interactions for a specific user 102. Suitable machine learning models for use with the ranking module 166 include, without limitation, an artificial neural network, a hidden Markov model (HMM), a Kalman filter (or enhanced Kalman filter), a Bayesian network (or Bayesian belief network), a support vector machine (SVM), a decision tree, or any suitable machine learning model that uses algorithms to effectively map input (e.g., user interactions) to output (prioritization). It is to be appreciated that the machine learning used by the ranking module 166 may be supervised or unsupervised machine learning.

The media serving component 168 is configured to cause display of at least a subset of the ranked media files on the computing devices 104. For example, a subset of the highest ranking media files may be presented on a UI of the computing device 104 for selection to perform an action with the selected media files (e.g., sharing the selected media files). As another example, a subset, or the entire collection, of media files may be presented in, for example, a slideshow according to the ranked order of media files. The most important media files may be grouped in organizational structures according to the user interaction characteristics associated with the media files (e.g., media files with similar user behaviors and social interactions associated therewith may be grouped together), and may be manipulated or otherwise used for any suitable action, such as sharing the highest ranked media files over the network 110 and/or to other computing devices 104.

In some embodiments, the media serving component 168 is configured to select an appropriate number of media files to highlight for a given action that is requested by a user 102. For example, a user 102 may invoke an email application having functionality to attach media files to an email that is to be sent to a recipient. In this example, the media serving component 168 may offer the user a limited number of files that may be suitable for the purpose of emailing (e.g., limited to five digital images). In other contexts, the selected number of media files to present to the user may be different, such as when the user 102 invokes short message service (SMS) text functionality where the number may be further limited as compared to email. Thus, the selected number of media files to highlight may be dependent on a particular action to be performed on the computing device 104 with the to-be-selected media files. In some embodiments, the media serving component 168 may present groups of media files where the groups are in ranked order, such as when media files with similar user interaction data are grouped together and an average ranking among the media files in a group may be associated with the group for purposes of prioritization. Furthermore, it is to be appreciated that the prioritization and presentation of media files may be performed for an individual user 102(1) (i.e., user-specific prioritization), or a group of users 102, such as a family or other type of shared user profile.

While FIG. 1 illustrates that the media file manager 124, and the subcomponents therein, is stored on or accessible by the cloud storage service(s) 126, in some instances some or all of these components in the media file manager 124 may reside on one or more other entities to be executed on the one or more other entities. For instance, some or all of these components in the media file manager 124 may reside on the computing devices 104 to be executed by the processor(s) 108 in some instances. Furthermore, in some instances, the components shown on the cloud storage service(s) 126 may provide code to the respective computing devices 104 to perform the respective functionality of the component. In this manner, any amount of the workload to implement the media file manager 124 and its subcomponents may be divided across devices (e.g., divided between the cloud storage service(s) 126 and one or more of the client-side computing devices 104.

Example Media File Prioritization

Figure 2:
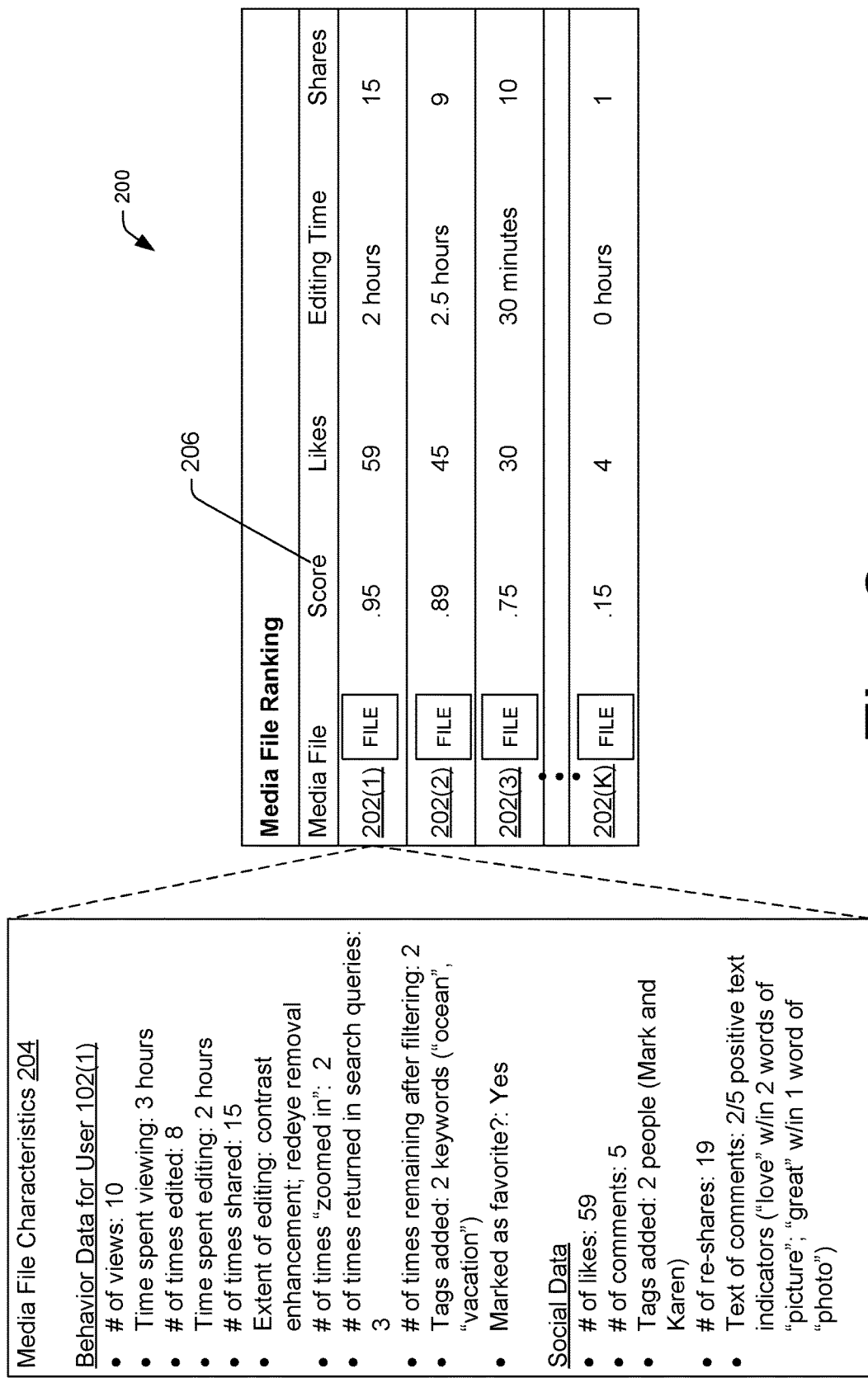
FIG. 2 is an example of a ranked list of media files from a personal collection of media files, and a non-exhaustive list of media file characteristics associated with one of the media files in the ranked list.

FIG. 2 is an example of a ranked list 200 of media files 202(1), 202(2), 202(3), . . . , 202(K) (collectively 202) from a personal collection of media files, such as the media files stored in either or both of the local media file store 112 or the cloud-based media file store 138 with respect to a user 102. The ranked list 200 may be the output of the ranking module 166, introduced in FIG. 1, that considers user interaction characteristics embodied in the user behavior data 118 and the social data 120. To this end, FIG. 2 further illustrates that each media file 202 may be associated with a number of media file characteristics 204, including the aforementioned user interaction characteristics, some of which are listed in FIG. 2 with respect to media file 202(1). The characteristics 204 shown in FIG. 2 are merely examples, and other characteristics may also be used, such as characteristics inherent to the media file, such as quality metrics (e.g., resolution, contrast, color, etc.). Any or all of the characteristics 204 may be used as a basis to rank the media files 202 according to one or more ranking strategies.

The ranked list 200 of FIG. 2 further illustrates that an "importance" score 206 may be associated with each media file 202 in the ranked list 200. The importance score may be utilized by the ranking module 166 as an overall metric by which the media files 202 may be ranked relative to each other, and the importance score may be a function of at least the user behavior data 118 and the social data 120, examples of which are shown in the media file characteristics 204. As discussed above, the ranking module 166 may consider a variety of user interactions (i.e., user behaviors and social interactions) in any combination as part of a rule-based approach that prioritizes based on these user interactions with the individual media files.

Example Media File Matching

Figure 3:
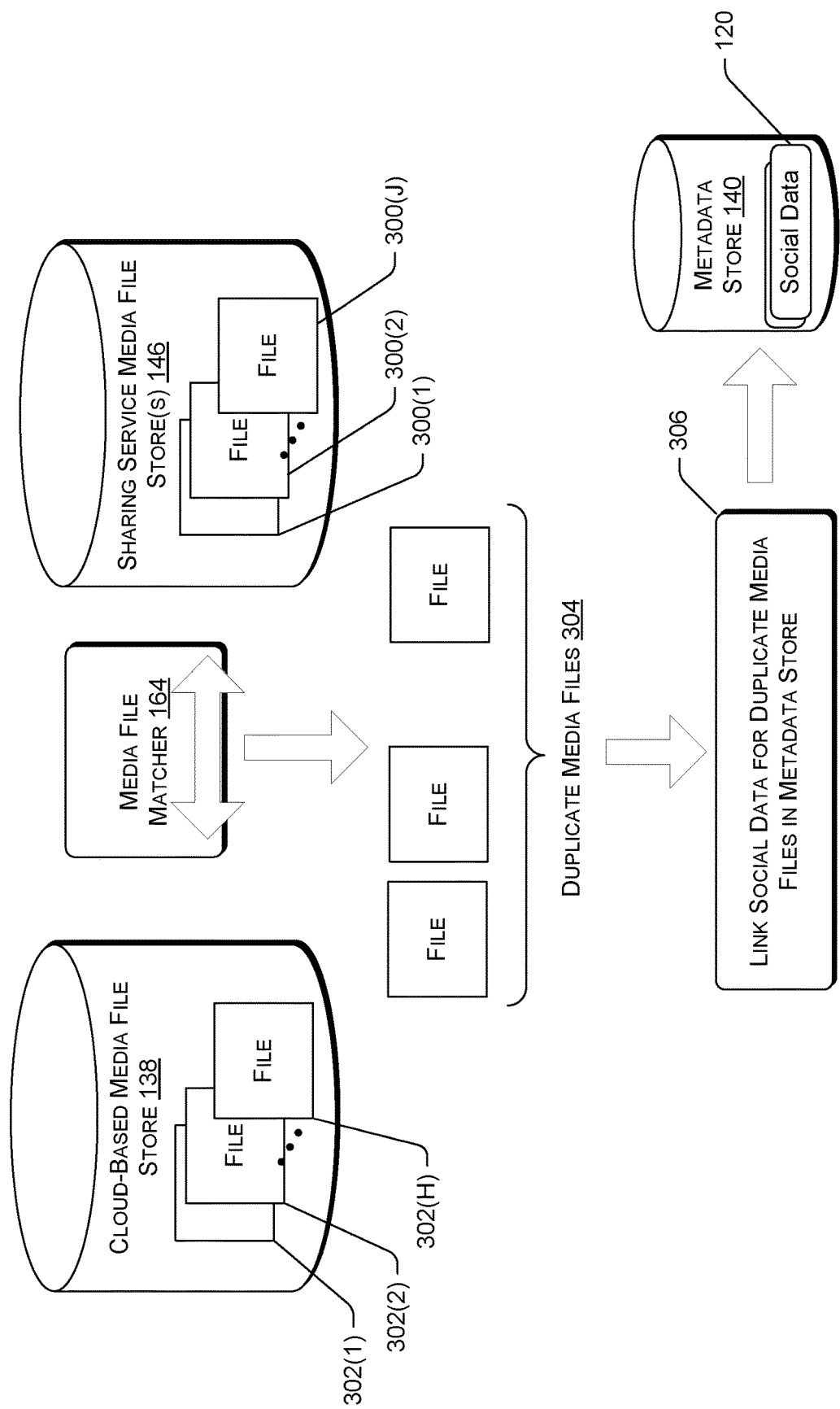
FIG. 3 is a schematic diagram of an example technique for matching files shared on a media file sharing service to files of a personal collection in order to link social data to the media files in the personal collection.

FIG. 3 is a schematic diagram of an example technique for matching files 300(1), 300(2), . . . , 300(J) (collectively 300) shared on a media file sharing service, such as the media file sharing service(s) 122, to files 302(1), 302(2), . . . , 302(H) (collectively 302) of a personal collection in order to link social data, such as the social data 120, to the media files 302 in the personal collection. The matching may be performed by the media file matcher 164 to find those media files stored in the media file store 146 of the media file sharing service(s) 122 that match individual media files stored in the cloud-based media file store 138. The shared media files 300 are typically those that are associated with a user/social profile of a particular user 102 for which the media files are to be prioritized, but that may not always be the case. That is, the media files 300 maintained by the media file sharing service(s) 122 may represent media files that were shared by the user 102(1) via her social profile, media files that the user 102(1) has been tagged in, media files posted to the "wall" of the user 102(1) by other users 102 in the community, and so on, which are all ways in which the media files 300 may be associated with a social profile of the user 102(1). However, the media files 300 may have been posted or otherwise shared by different users 102 in the community and not associated with the social profile of the user 102(1). For example, a different user 102(M) may post a picture on the media file sharing service(s) 122.

In some embodiments, the media file matcher 164 may be implemented on a computing device 104 such that the comparison of the shared media files 300 would be with respect to the media files stored in the local media file store 112 of the computing device 104. In either case, the effect is the same considering the synchronization that occurs between the cloud storage service(s) 126 and the computing devices 104 to maintain a consistent personal media file collection between the multiple storage locations.

As mentioned above, the media file matcher 164 may utilize any suitable technique or criteria for determining whether two media files match. In some embodiments, a duplicate detection algorithm may be utilized by the media file matcher 164 that uses a similarity metric to determine whether two media files are matching. In the digital image context, this may involve image analysis techniques where two digital images are analyzed for similar visual features or saliency (i.e., pixel data). In some embodiments, feature vectors may be generated for each image, and corresponding hash codes may be created that are comparable between images for judging similarity. In yet other embodiments, metadata of two media files may be compared to determine a match. Again, in the context of digital images, a camera serial number, time data, and/or geolocation data may be compared to determine whether there is similarity at or beyond a threshold for two media files to be considered a match. In any case, the media file matcher may determine a matched set 304 of media files based on the comparison between the shared media files 300 and the media files 302 in the personal collection.

This approach allows for discovering individual media files in the personal collection of media files 302 that have been shared through programs or applications that may not be associated with the media file manager 124 or its associated client-side programs. In this way, sharing activity that occurs at the computing device 104 via a third party application downloaded to the computing device 104 does not have to be monitored. In one illustrative example, the media file matcher 164 may identify one or more of the media files 300 that were shared by the user 102(1) via a third party application on the client computing device 104(1). In another example, the media file matcher 164 may identify one or more of the media files 300 that were shared by a different user 102(M) and subsequently downloaded by the user 102(1). In this manner, the media file matcher 164 may identify matched media files regardless of any association with the user 102(1) on the media file sharing service(s) 122. Once the matched set 304 is determined, the social data 120 associated with the individual media files in the matched set 304 may be correlated at 306 to the instances of the media files in the personal collection of the user 102 by storing the collected social data 120 in the cloud-based metadata store 140 in association with the matched set 304 maintained in the cloud storage service(s) 126.

Example User Interfaces (UIs)

Figure 4A:
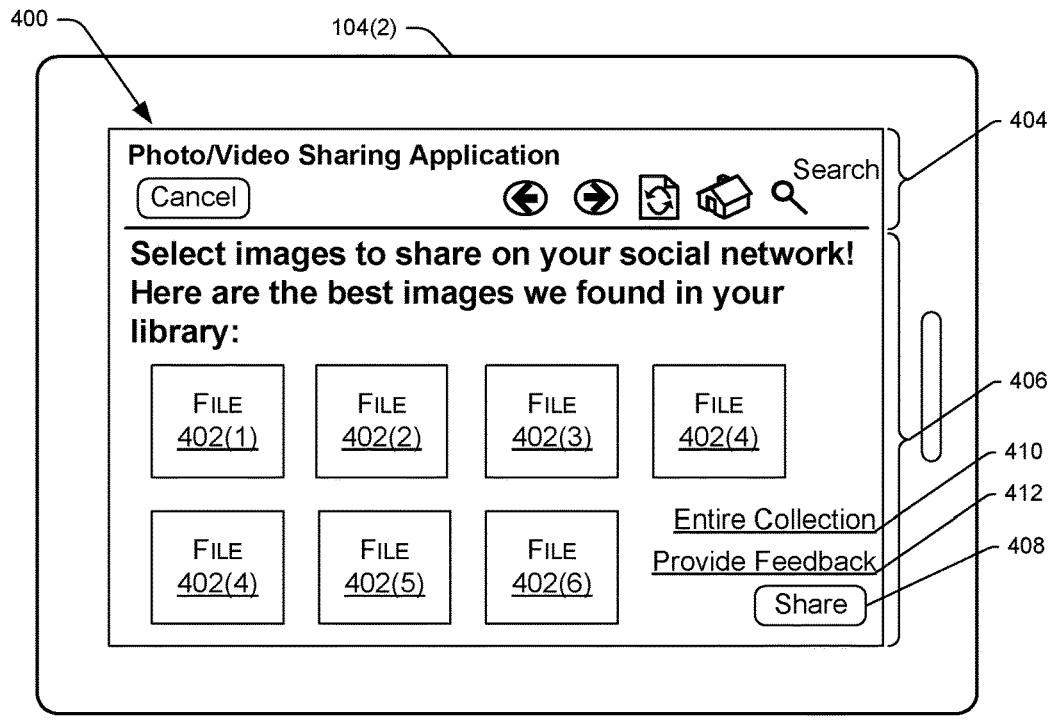
FIG. 4A illustrates an example client computing device with a screen rendering of an example user interface (UI) presenting prioritized media files for sharing.

FIG. 4A illustrates an example client computing device 104(2) in the form of a tablet computing device with a screen rendering of an example user interface (UI) 400 presenting prioritized media files 402(1), 402(2), 402(3), 402(4), 402(5), and 402(6) for sharing. The UI 400 is merely one illustrative example of a suitable manner for presenting and acting upon the most important media files 402(1)-(6) determined by the ranking module 166 and presented by the media serving component 168. In the illustrative example of FIG. 4A, the UI 400 includes a header portion 404 that may include navigation tools (e.g., on-screen navigation elements, a header description to tell the user 102 that they are executing a "photo/video sharing application," and a cancel button to abort the sharing action before it is completed. In this example, a selection portion 406 of the UI 400 includes the media files 402(1)-(6) that represent a subset of media files in a personal collection, such as the entire repository of media files stored in either the local media file store 112 or the cloud-based media file store 138, or both. The subset of media files 402(1)-(6) may be selected as the highest ranking media files among the collection, as determined by the ranking module 166.

In the context of FIG. 4A, the media files 402(1)-(6) represent images that the user 102 desires to share via a photo/video sharing application. The user 102 may select some or all of the subset of media files 402(1)-(6) that has been automatically provided to the user 102 for selection without user intervention, and may select a share button 408 to share selected ones of the media files. In this manner, the user 102 is saved from the effort of sorting through a massive collection of media files to find the most important files to share. If the user 102 is unsatisfied with the selection of the media files 402(1)-(6), the user 102 may optionally navigate to their entire media file collection by selecting a link 410 to choose other media files for sharing. Additionally, or alternatively, a user feedback mechanism 412 may be provided, such as via a link, to allow the user 102 to provide the media file manager 124 with feedback that it can use to learn about the user's preference for media files and to implement changes to the ranking strategy used by the ranking module 166 as a consequence. The feedback may be positive or negative to allow the ranking module 166 to aggregate feedback and leverage a machine learning module to correlate the types of user behaviors and social interactions that indicate importance to the particular user 102 that provides the feedback.

While the example UI 400 is rendered as part of a local application or program on the computing device 104(2), it is to be appreciated that, in other instances, the UI 400 may be rendered as a web-based implementation (e.g., a web page served by the cloud storage service(s) 126 and rendered via a web browser on the computing device 104(2), or any other UI mechanism.

Figure 4B:
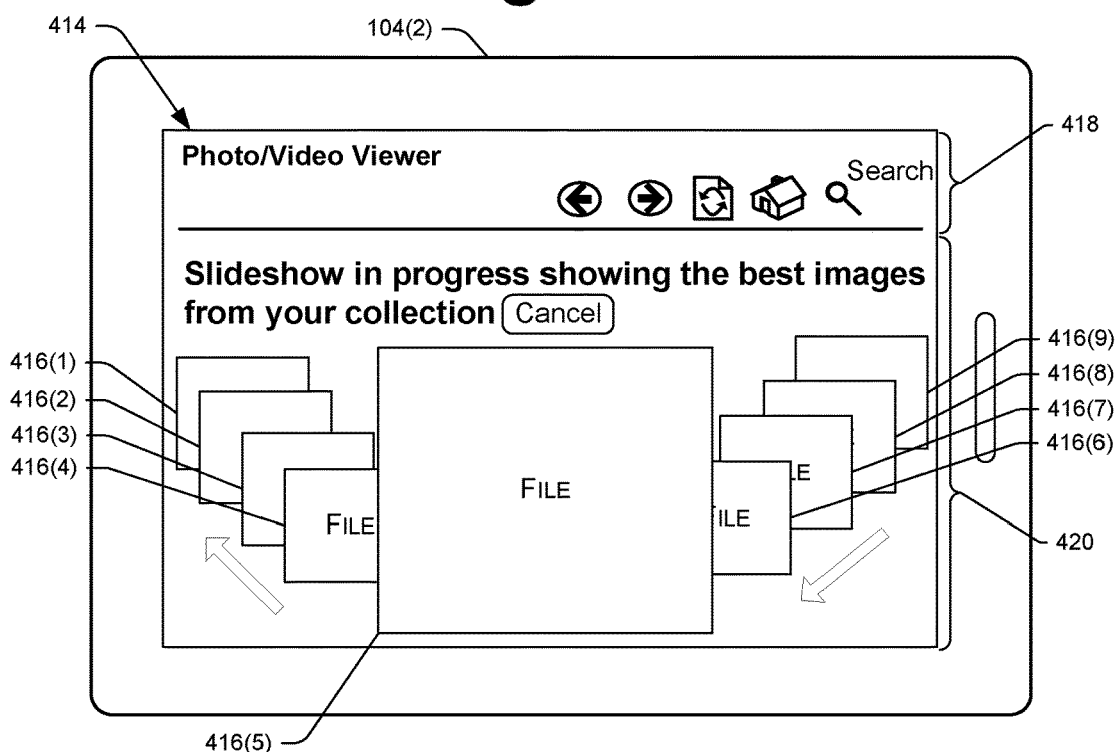
FIG. 4B illustrates the example client computing device of FIG. 4A with a screen rendering of another example UI according to another embodiment that presents prioritized media files in a slideshow.

FIG. 4B illustrates the example client computing device 104(2) of FIG. 4A, this time with a screen rendering of another example UI 414 according to another embodiment that presents prioritized media files in a slideshow format. The UI 414 is merely one illustrative example of a suitable manner for presenting the most important media files 416(1)-(9) determined by the ranking module 166. In the illustrative example of FIG. 4B, the UI 414 includes a header portion 418 that may include navigation tools (e.g., on-screen navigation elements, and a header description to tell the user 102 that they are currently executing a "photo/video viewing application," among other information that may be provided in the header portion 418. The UI 414 includes in a presentation portion 420 where the media files 416(1)-(9) are presented. The media files 416(1)-(9) may represent a subset of media files in a personal collection, such as the entire repository of media files stored in either the local media file store 112 or the cloud-based media file store 138, or both. The subset of media files 416(1)-(9) may be presented first in a slideshow relative to other media files in the personal collection that received lower rankings by the ranking module 166. In this manner, the user 102 may be delighted by the most important media files in the collection, where the lower ranking media files are either presented later in the slideshow, or are omitted from the slideshow entirely. In order to decide which media files are omitted, the media serving component 168 may reference a predetermined threshold to cutoff the presentation at only the top 50 media files, for example. This predetermined threshold may be based on the context or application in which the media files are to be presented, in this case a slideshow may be limited to showing only the top 50 media files. Other contexts or applications may select more or fewer media files to highlight for presentation. For example, a single highest ranking media file, or a subset of the highest ranking media files may be presented in "live tiles" of a home screen on the computing device 104(2). One example of a suitable implementation for this embodiment is the "live tile" functionality offered by Windows® operating system commercially available from Microsoft® Corporation of Redmond, Wash. In this manner, a home screen may scroll through the highest ranking media files on the computing device 104(2). As yet another example, the media serving component 168 may present the highest ranking media file for the user to select as a "wallpaper" of a background UI on the computing device 104(2). A variety of suitable presentation scenarios are envisioned herein, and the presentation schemes are not limited by those shown in FIGS. 4A and 4B.

Example Processes

FIGS. 5-9 are a flow diagram of example processes according to embodiments disclosed herein. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

Figure 5:
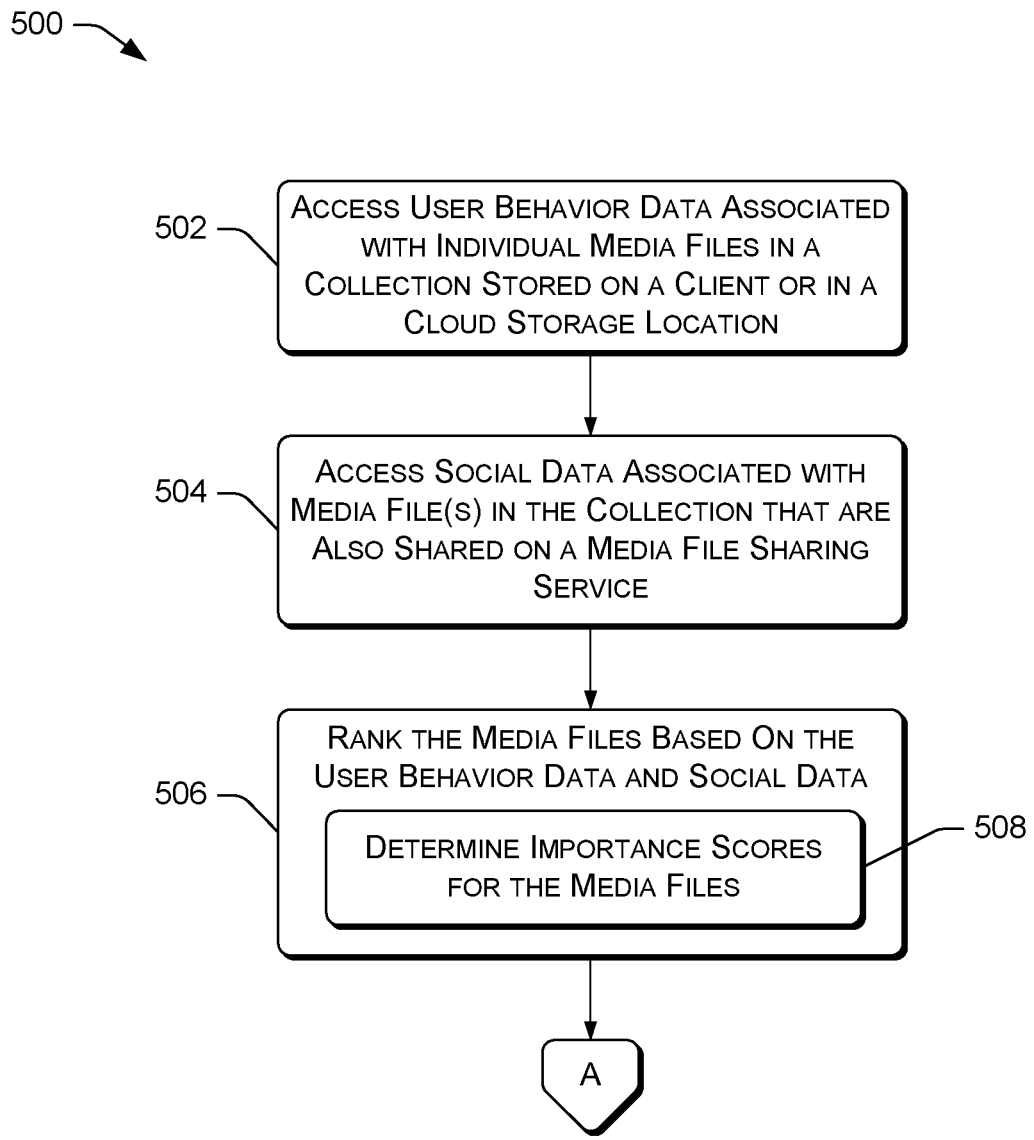
FIG. 5 is a flow diagram of an illustrative process of ranking media files based on user behavior data and social data.

FIG. 5 is a flow diagram of an illustrative process 500 of ranking media files based on user behavior data 118 and social data 120 associated with individual ones of the media files. The process 500 is described with reference to the architecture 100 of FIG. 1, and with particular reference to the ranking module 166 and the media file matcher 164, among other elements shown in FIG. 1.

At 502, the ranking module 166 may access user behavior data 118 associated with individual media files in a set of media files that are stored on a client computing device 104 of a user 102 or in a cloud-based storage location associated with the user 102. The user behavior data 118 may be accessed from the cloud-based metadata store 140, or the local metadata store 116 when the ranking functionality is provided on the computing device 104. The media files included in the collection may be one or more of images, videos, or any other suitable media file type, or combination of media file types (e.g., multimedia files), and the user behavior data 118 that is accessed for these individual media files may include any suitable user behaviors that have been tracked by the behavior tracker 128 and stored as the user behavior data 118. For example, the ranking module 166 may access, at 502, behavior data of a particular user 102(1) with respect to the media files in the collection that specifies the number of times the user 102(1) has edited the media file (e.g., editing actions using an image editing application). Other local user behaviors that are tracked and stored may be accessed in the alternative or in combination with other local user behaviors.

At 504, the ranking module 166 may access social data 120 associated with one or more of the media files in the collection that are determined to have been shared on a media file sharing service(s) 122. The social data 120 may be accessed from the cloud-based metadata store 140, or the local metadata store 116 when the ranking functionality is provided on the computing device 104. Moreover, the one or more media files for which social data 120 is accessed are those media files that have been determined by the media file matcher 164 to be a common/matched set 304 of media files between the collection of media files and the media file sharing service 122. As described above, the matched set 304 may be determined by any suitable technique, such as by using a duplicate detection algorithm to scan media files on the media file sharing service to determine which, if any, match those in the personal collection of the user 102. In this manner, the social data 120 accessed at 504 may be limited to the matched set of files 304.

At 506 the ranking module 166 ranks or prioritizes the media files in the collection based on the user behavior data 118 accessed at 502 and the social data 120 accessed at 504. It is appreciated that, in some instances, individual media files in the collection may not have been shared to a media file sharing service 122. However, those files are still to be included in the ranked set; they will merely be ranked according to the user behavior data 118 that is associated with them, while the remaining media files in the collection that are determined to have been shared to the media file sharing service(s) 122 are ranked using both user behavior data 118 and social data 120 associated with them. In some embodiments, additional factors may be considered in the ranking at 506, such as quality metrics that work to surface better quality media files over lower quality media files (e.g., more visually pleasing images), diversity metrics to surface a diverse set of media files, relevance metrics to surface more relevant media files over less relevant media files (e.g., those that a user 102 interacted with using preferential behaviors, and/or those that familiar acquaintances of the user 102 interacted with on a social platform, etc.).

In some embodiments, the ranking step at 506 involves a sub-operation 508 of determining an importance score for each of the media files in the collection. That is, the statistics embodied in the user behavior data 118 and the social data 120 that characterize individual media files may be combined or otherwise utilized to compute an overall "importance score" at 508 that determines the ranking order relative to other media files in the collection. In this manner, the ranking values associated with each media file in the collection are quantifiable.

Figure 6:
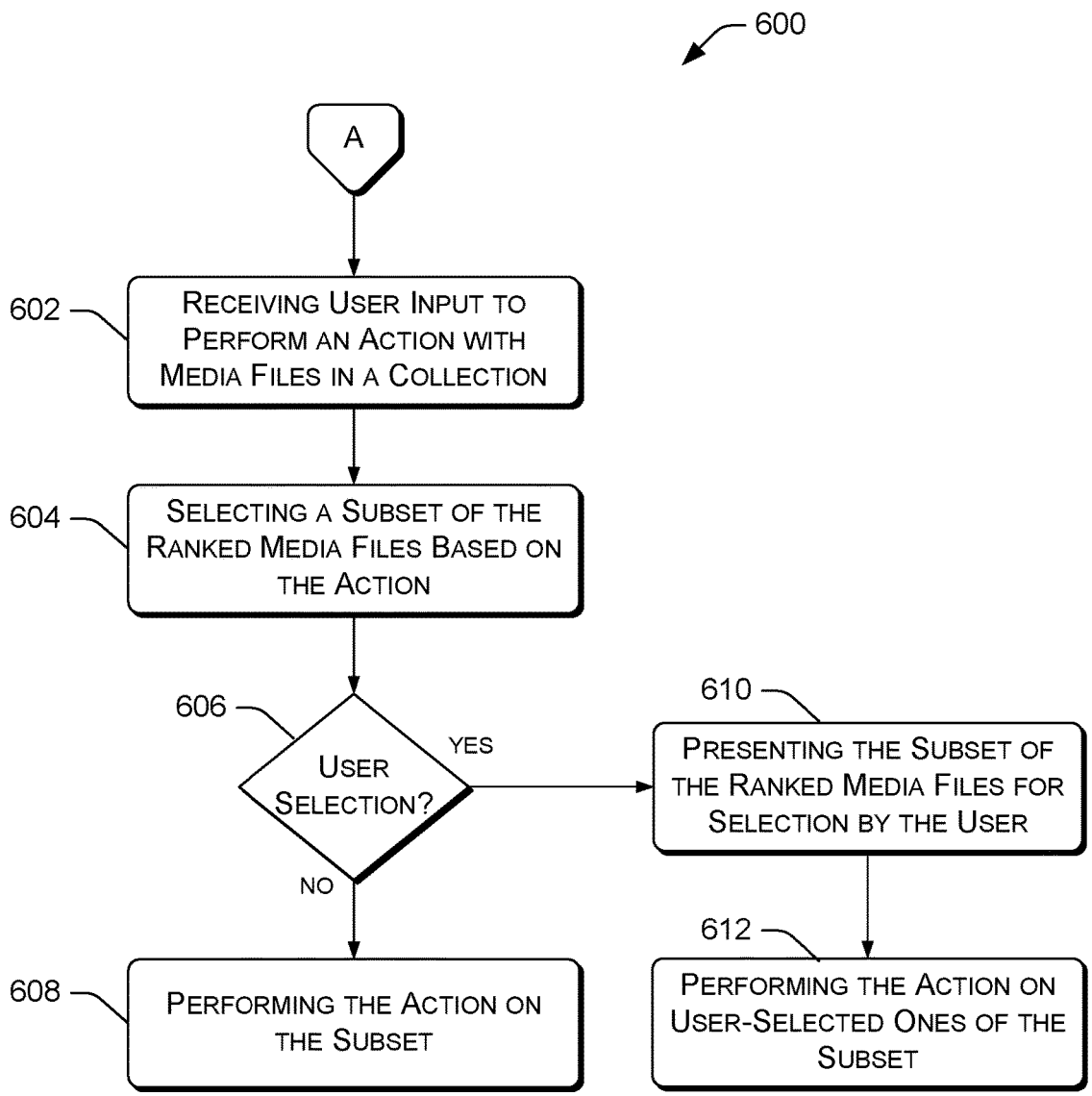
FIG. 6 is a flow diagram of an illustrative process of presenting media files in a collection of media files based on a ranking of the media files.

FIG. 6 is a flow diagram of an illustrative process 600 of presenting media files in a collection of media files based on a ranking of the media files. The process 600 is described with reference to the architecture 100 of FIG. 1, and with particular reference to the media file manager 124 including the media serving component 168, among other elements shown in FIG. 1. Moreover, as shown by the off-page reference "A" in both of FIGS. 5 and 6, the process 600 may, in some embodiments, continue from step 506 of the process 500 in that a collection of media files is presumed to have been ranked by the ranking module 166 at the time that the process 600 is initiated.

At 602, the media file manager 124 may receive an indication of a user input that is indicative of a request to perform an action with media files in a collection of media files, such as the media files stored in the local media file store 112 or the cloud-based media file store 138. For example, a browser executing on the computing device 104 may allow a user 102 to invoke the media file manager 124 on the cloud storage service(s) 126 to provide the user input, or, alternatively, a standalone client-side application or program may be invoked/launched on the computing device 104 where the user 102 may provide user input via the client-side application or program, which may, in turn, access the media file manager 124 locally or over the network 110. In any case, the user input may be indicative of a presentation action (e.g., initiating a slideshow presentation), a sharing action to share a subset of the media files in the collection, a user customization action (e.g., designating an image as a background or "wallpaper" on the computing device 104, or any similar action involving the media files in the collection.

At 604, the media serving component 168 may select a subset of the media files in the collection based on the action. Again, since the media files have already been ranked by the ranking module 166, as shown and described with reference to the process 500 of FIG. 5, the selection of the subset at 604 may comprise selecting a predetermined number of the highest ranking media files in the collection (e.g., the top 10 media files). Depending on the action indicated by the user input in 602, the number of media files selected at 604 may vary. For example, a slideshow action may allow for selecting a larger subset to be presented in the slideshow, while a sharing action may allow for a smaller subset of media files to be shared, such as over a wireless interface to another computing device 104 and/or over the network 110 to the media file sharing service 110.

At 606, a determination is made as to whether the action indicated by the user input at 602 involves user selection of individual media files in the subset. If not, the process 600 may proceed to 608 where the action is performed on the subset. For example, the user may provide input at 602 to initiate a slideshow presentation, and the determination at 606 is that there is no user selection involved in presenting a slideshow, so the slideshow is presented for the subset of media files at 608.

If it is determined at 606 that user selection is involved with the action indicated at 602, then the process 600 may proceed to 610 where the user is presented with the subset of media files for selection. The user 102 may select some or all of the presented subset at 610. For example, the user may select a few of the media files in the subset to share with friends on the media file sharing service 122. At 612, the action is performed on the user-selected media files (e.g., the selected media files are shared).

Figure 7:
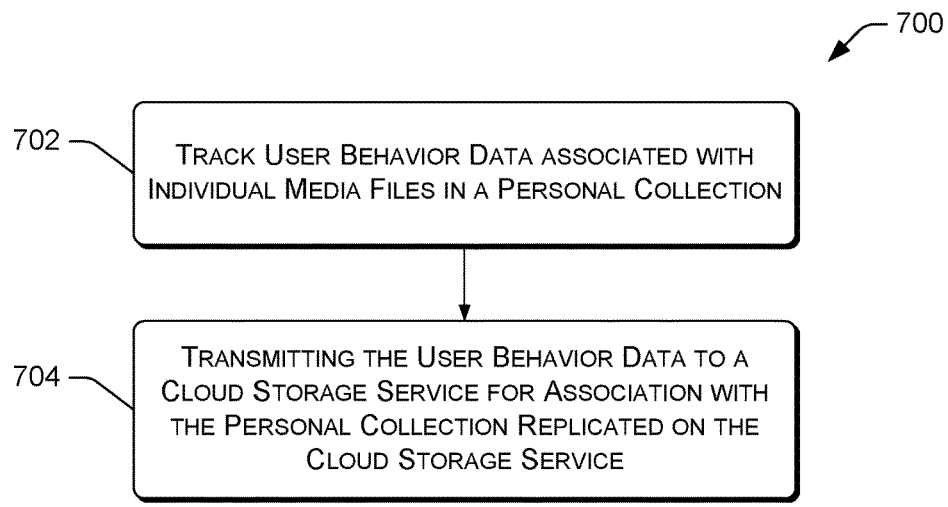
FIG. 7 is a flow diagram of an illustrative process of tracking user behavior data associated with individual media files in a personal collection.

FIG. 7 is a flow diagram of an illustrative process 700 of tracking user behavior data 118 associated with individual media files in a personal collection. The process 700 is described with reference to the architecture 100 of FIG. 1, and with particular reference to the behavior tracker 128.

At 702, the behavior tracker 128 may track user behavior data 118 associated with individual media files in a personal collection. For example, the behavior tracker 128 may plug into a program on the client computing device 104 that is configured to monitor user interactions with individual media files in the context of the program, or in the context of other programs that offer APIs therebetween. For example, a photo viewing/editing application on the computing device 104 may allow an associated user 102(1) to interact with digital images in a personal collection in various ways, such as viewing, editing (e.g., color editing, contrast adjustment, cropping, etc.). The behavior tracker 128 may monitor these behaviors of the user 102(1) with respect to the digital images and associated those behaviors as user behavior data 118 that characterize each digital image that the user 102(1) interacts with.

At 704, the user behavior data 118 tracked by the behavior tracker 128 may be transmitted to a cloud storage service(s) 126 for association with the personal collection of media files associated with the user 102(1) that is replicated in a storage location of the cloud storage service 126. For example, a background synchronization process between the cloud storage service 126 and the computing device 104 of the user 102(1) may cause the user behavior data 118 to be replicated in the cloud-based metadata store 140 by transmitting the user behavior data 118 over the network 110. In this manner, user behavior data 118 may be constantly tracked at 702 on the client computing device 104 and synchronized with the cloud storage service(s) 126 to provide consistency in the metadata between the multiple storage locations so that it may be readily accessed from either or both locations.

Figure 8:
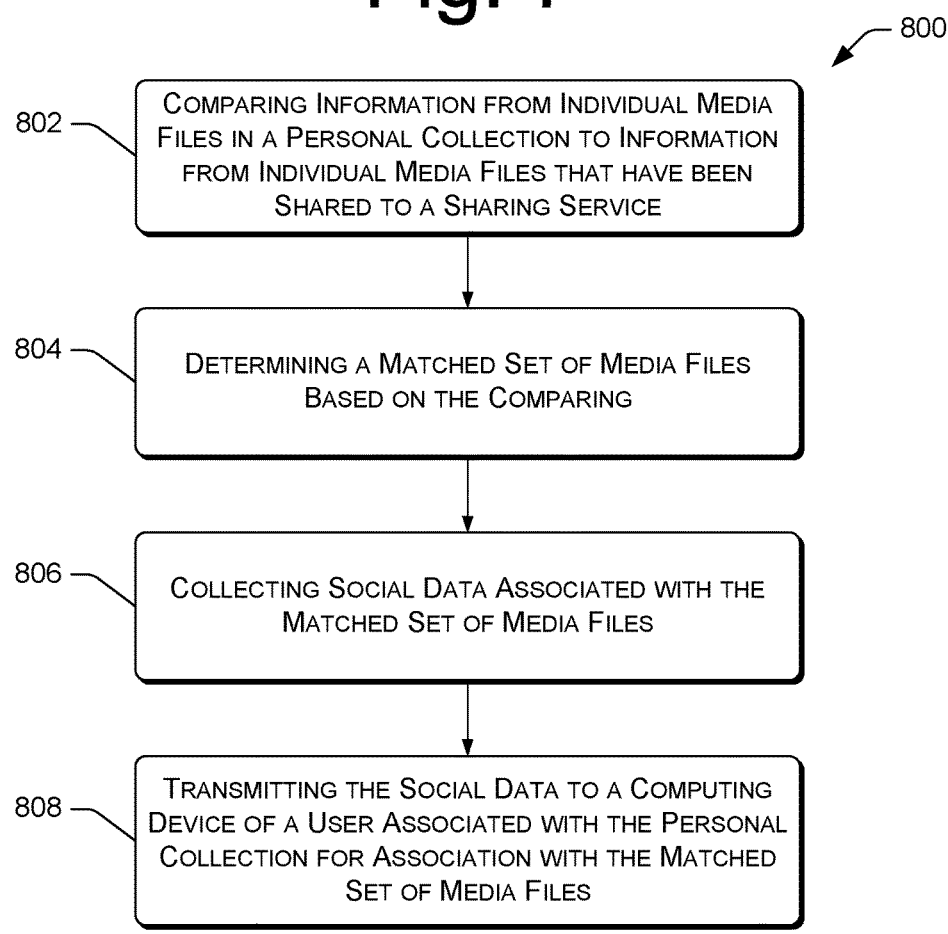
FIG. 8 is a flow diagram of an illustrative process of collecting social data associated with individual media files in a personal collection.

FIG. 8 is a flow diagram of an illustrative process 800 of collecting social data 120 associated with individual media files in a personal collection. The process 800 is described with reference to the architecture 100 of FIG. 1 and the schematic diagram of FIG. 3, and with particular reference to the data collector 156, and the media file matcher 164, among other elements shown in FIGS. 1 and 3.

At 802, the media file matcher 164 may compare information (e.g., metadata, content features like visual or audio features, etc.) from the individual media files in a personal collection of media files (a first set of media files) to information (e.g., metadata, content features like visual or audio features, etc.) from individual media files that have been shared to a media file sharing service 122 (a second set of media files). In some embodiments, the second set of media files are a subset of media files on the media file sharing service 122 that are associated with a profile of a user 102(1) who owns the personal collection of media files. For example, the user 102(1) may have shared digital images or videos via her social profile, her social profile may be tagged in images or videos shared by other users 102 on the media file sharing service 122, or the user 102(1) may appear in images or videos shared by other users 102, and so on. In other instances, the second set of media files may not be associated with the user 102(1), such as when a different user 102(M) posts or shares one or more of the media files in the second set of media files. This "pool" of media files that have been shared are compared with the individual media files in the personal collection of the user 102(1). As described above, the comparison may use a duplicate detection algorithm or similar comparison technique to compare information from two media files.

At 804, a matched set (common set) of media files is determined by the media file matcher 164 based on the comparing at 802. That is, media files in both the personal collection and on the media file sharing service 122, may be included in the matched set. The matching criteria used to determine that two files match may be based on a distance metric or other similarity measure derived from the duplicate detection algorithm, as described above.

At 806, the data collector 156 collects the social data 120 associated with the matched set of media files. The social data 120 may be any suitable type of user interaction data that may be obtained from the media file sharing service 122, such as a number of likes, a number of comments, and so on. At 808, the collected social data 120 may be transmitted to a computing device 104 of a user 102(1) associated with the personal collection for association with the matched set of media files in the personal collection. For example, a background synchronization process between the cloud storage service 126 and the computing device 104 of the user 102(1) may cause the social data 120 to be replicated at the local metadata store 112 by transmitting the social data 120 over the network 110. In this manner, social data 120 may be repeatedly collected at 806 by the cloud storage service 126 and synchronized with the client computing devices 104 to provide consistency in the metadata between the multiple storage locations so that it may be readily accessed from either or both locations.

Figure 9:
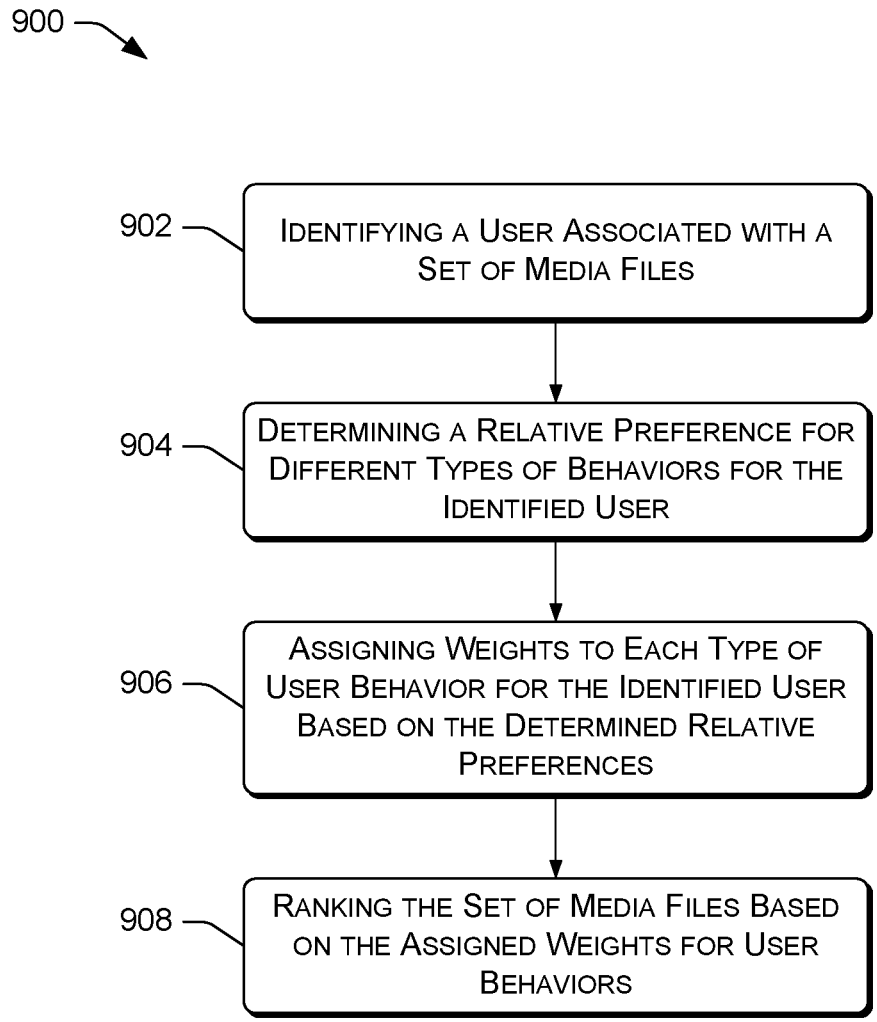
FIG. 9 is a flow diagram of an illustrative process of ranking media files using a ranking approach that is user-customizable.

FIG. 9 is a flow diagram of an illustrative process 900 of ranking media files using a ranking approach that is user-customizable. At 902, a user 102(1) may be identified as being associated with a set of media files. For example, a user 102(1) logged into a client computing device 104 with a media file collection stored thereon that is accessible by the user profile of the user 102(1) may be identified by virtue of the login procedure (receipt of credentials tied to the user 102(1)). In other embodiments, other types of identification techniques may be utilized, such as by receiving biometric information (e.g., fingerprint, facial recognition, etc.) perhaps when the user 102(1) is operating the client device 104.

At 904, a relative preference for different types of user behaviors may be determined for the user 102(1). For example, the media file manager 124 may analyze a history of behaviors performed by the user 102(1) and may determine a preference for certain user behaviors in various ways. For instance, the media file manager 124 may analyze a number, frequency, or an amount of time that the user 102(1) has performed any given behavior (e.g., editing, viewing, sharing, etc.) to determine a predominant behavior as a highest occurring, highest frequency, and/or highest amount of time behavior. From this information, preference for certain behaviors over others may be deduced. For example, a user 102 that shares media files much more often and in greater numbers than she does printing media files may be determined to have a preference for sharing over printing media files.

In other embodiments, the relative preference determined at 904 may be based on a machine learning model that correlates importance of individual media files to particular users 102 and user behaviors associated with those media files. This may be enabled by feedback that is provided by the users 102 to validate whether prioritized media files are important to the users 102 so that the ranking module 166 may learn from this feedback to determine preferential behaviors.

At 906, weights may be assigned to user behaviors based on relative preference determined at 904. For example, higher weights may be associated with preferred user behaviors. Continuing with the above example, a user behavior of sharing media files would be assigned a higher weight than a user behavior of printing because the user 102(1) has established a preference for sharing media files over printing media files.

At 908, the ranking module 166 may rank the set of media files based on the assigned weights for the user behaviors to which the weights are assigned. In this manner, different ranking approaches/strategies may be employed on a per-user basis that are catered to individual users 102 or groups of the users 102. That is, the user behaviors that influence media file prioritization the most for each individual user 102 or group of users 102 will be weighted accordingly by the ranking module 166 in considering the user behavior data 118 according to which the media files are ranked.

Although FIG. 9 is described in terms of determining user preferences for different types of user behaviors, the process 900 could be applied similarly for assigning weights to the social data 120 to make the use of the social data 120 customizable to a specific user 102. For instance, social data 120 associated with different users 102 may carry a different weight depending on the user 102(1) who is identified at 902 in the process 900 and the current state of a relationship between the user 102(1) and the different users 102 associated with the social data 120. Specifically, a family member of the user 102(1) may "like" or comment on a media file in the collection of the user 102(1), which would represent social data 120 that influences the rank of the media file that the family member interacted with. The fact that the family member is closely related to the user 102(1) may cause the ranking module 166 to assign a weight to the social data 120 associated with the family member that is indicative of the likely influence of the family member's social interaction to the importance of that media file to the user 102(1). However, the same family member user that "likes" or comments on a media file from a different user 102(M) that is not closely related to the family member or the user 102(1) may not influence the ranking for the user 102(M) to the degree that it does for the user 102(1). In other words, weights may be associated with social data 120 based at least in part on the existing relationship between the user 102(1) identified at 902 and the user(s) 102 associated with the social data 120 used by the ranking module 166.

In some embodiments, the social data 120 used by the ranking module 166 may be weighted based on learning preferences of certain users 102 in the community of users 102 for certain types of social interactions. That is, a user 102(M) that comments on media files more often than she "likes" media files may indicate that a comment from the user 102(M) may influence the rank of the media file more heavily than a "like" from the user 102(M), or vice versa, depending on how the social data 120 is to be utilized.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE ONE

A method comprising: accessing, by one or more computing devices, behavior data of a user, the behavior data associated with individual media files in a set of media files that are stored on a client device of the user or in a cloud-based storage location associated with the user; accessing, by the one or more computing devices, social data associated with one or more media files of the set of media files that are determined to have been shared on a media file sharing service; and ranking, by the one or more computing devices, the set of media files based at least in part on the behavior data and the social data.

EXAMPLE TWO

The method of Example One further comprising causing representations of a first media file and a second media file in the set of media files to be presented on a viewing device in an order based at least in part on the ranking.

EXAMPLE THREE

The method of any of the previous examples, alone or in combination, wherein a first media file in the set of media files is ranked higher than a second media file in the set of media files, and causing a representation of the first media file to be presented on a viewing device for selection in performing an action with the first media file.

EXAMPLE FOUR

The method of any of the previous examples, alone or in combination, wherein the action includes at least one of sharing the first media file over a network to a computing device that is remote from the viewing device, printing the first media file, saving the first media file as a wallpaper (e.g., desktop background) for the viewing device, or associating the first media file with a contact of the user on the viewing device.

EXAMPLE FIVE

The method of any of the previous examples, alone or in combination, further comprising: identifying the user; analyzing past behaviors (e.g., viewing, sharing, editing, etc.) of the user to determine a user preference for a first user behavior over a second user behavior; and assigning a first weight to the first user behavior and a second weight to the second user behavior based at least in part on the user preference, the first weight being higher than the second weight, wherein the ranking is further based at least in part on the first weight and the second weight.

EXAMPLE SIX

One or more computer-readable storage media comprising memory storing a plurality of programming instructions that are executable by one or more processors of a computing device to cause the computing device to perform acts comprising: accessing behavior data of a user, the behavior data associated with individual media files in a collection of media files that are stored on a client device of the user or in a cloud-based storage location associated with the user; accessing social data associated with one or more media files of the collection of media files, the social data having been obtained from a media file sharing service upon determining that copies of the one or more media files were shared to a website of the media file sharing service; and ranking the collection of media files based at least in part on the behavior data and the social data.

EXAMPLE SEVEN

The one or more computer-readable storage media of Example Six, wherein the determining that the copies of the one or more media files were shared to the website of the media file sharing service further comprises: comparing information associated with individual media miles (e.g., information unique to the individual media files such as unique metadata, visual features for images, audio features for audio files, etc.) on the website to information associated with the individual media files in the collection of media files; and identifying the copies of the one or more media files based at least in part on the comparing.

EXAMPLE EIGHT

The one or more computer-readable storage media of any of the previous examples, alone or in combination, further comprising obtaining the social data from the media file sharing service and associating the social data with the one or more media files of the collection of media files prior to the accessing the social data.

EXAMPLE NINE

The one or more computer-readable storage media of any of the previous examples, alone or in combination, further comprising tracking interactions of the user with the individual media files in the collection of media files to obtain the behavior data prior to the accessing the behavior data.

EXAMPLE TEN

The one or more computer-readable storage media of any of the previous examples, alone or in combination, wherein the information associated with the individual media files on the website comprises a code derived from a feature vector generated for the individual media files on the website, and wherein the comparing utilizes a duplicate detection algorithm based on the code.

EXAMPLE ELEVEN

The one or more computer-readable storage media of any of the previous examples, alone or in combination, wherein the information associated with the individual media files on the website comprises at least one of a camera serial number, time information, or geolocation information.

EXAMPLE TWELVE

The one or more computer-readable storage media of any of the previous examples, alone or in combination, further comprising receiving user consent to access the profile of the user for obtaining the social data.

EXAMPLE THIRTEEN

A system comprising: one or more processors; and memory storing computer-executable instructions that, when executed by the one or more processors, cause the one or more processors to perform acts comprising: accessing behavior data of a user, the behavior data associated with individual media files in a set of media files that are stored on a client device of the user or in a cloud-based storage location associated with the user; accessing social data associated with one or more media files of the set of media files that are determined to have been shared on a media file sharing service; and ranking the set of media files based at least in part on the behavior data and the social data.

EXAMPLE FOURTEEN

The system of Example Thirteen, wherein the behavior data includes data regarding interactions of the user with the individual media files in the set of media files.

EXAMPLE FIFTEEN

The system of any of the previous examples, alone or in combination, wherein the social data includes one or more of social approval or disapproval data regarding the one or more media files or comment data regarding the one or more media files.

EXAMPLE SIXTEEN

The system of any of the previous examples, alone or in combination, the acts further comprising causing representations of at least some media files in the set of media files to be presented based at least in part on the ranking.

EXAMPLE SEVENTEEN

The system of any of the previous examples, alone or in combination, the acts further comprising: receiving user input to perform an action with media files in the set of media files; selecting a subset of the set of media files based at least in part on the action; and performing the action on the subset.

EXAMPLE EIGHTEEN

The system of any of the previous examples, alone or in combination, wherein the action includes at least one of sharing one or more media files in the subset over a network to a remote computing device, printing one or more media files in the subset, initiating a slideshow presentation of the subset, presenting the subset as live tiles on a viewing device, saving a media file of the subset as a wallpaper (e.g., desktop background) of a viewing device, or associating a media file of the subset with a contact of the user.

EXAMPLE NINETEEN

The system of any of the previous examples, alone or in combination, the acts further comprising: identifying the user; analyzing past behaviors (e.g., viewing, sharing, editing, etc.) of the user to determine a user preference for a first user behavior over a second user behavior; and assigning a first weight to the first user behavior and a second weight to the second user behavior based at least in part on the user preference, the first weight being higher than the second weight, wherein the ranking is further based at least in part on the first weight and the second weight.

EXAMPLE TWENTY

The system of any of the previous examples, alone or in combination, wherein the past user behaviors indicate that the user performed the first user behavior (i) a greater number of times, (ii) at a higher frequency, or (iii) for a longer period of time than the second user behavior.

EXAMPLE TWENTY-ONE

A system comprising: means for storing computer-executable instructions (e.g., memory, computer readable storage media such as RAM, ROM, EEPROM, flash memory, etc.); and means for executing computer-executable instructions (e.g., processor(s), including, for example, hardware processor(s) such as CPUs, SoCs, etc.) to cause performance of acts comprising: accessing behavior data of a user, the behavior data associated with individual media files in a set of media files that are stored on a means for computing (e.g., a personal computer, a laptop computer, a smart phone, etc.) of the user or in a means for storing media files (e.g., database or data store of a web-based ("cloud") storage service, database or data store of a file hosting service, etc.) associated with the user and remotely located from the means for computing and accessible by the means for computing over a means for receiving and transmitting data to and from remotely located devices (e.g., a network such as the Internet, a telecommunications network, wireless network, etc.); accessing social data associated with one or more media files of the set of media files that are determined to have been shared on a means for storing shared media files (e.g., a database or data store of a media file sharing service, a database or data store of a social networking service, etc.); and ranking the set of media files based at least in part on the behavior data and the social data.

EXAMPLE TWENTY-TWO

The system of Example Twenty-One, wherein the action includes at least one of sharing one or more media files in the subset over a means for receiving and transmitting data to and from remotely located devices (e.g., a network such as the Internet, a telecommunications network, wireless network, etc.) to a remote means for computing (e.g., a remote personal computer, a remote laptop computer, a remote smart phone, a database or data store of a media file sharing service, a database or data store of a social networking service, etc.), printing one or more media files in the subset, initiating a slideshow presentation of the subset, presenting the subset as live tiles on a means for viewing media files (e.g., a display, such as a television display, a display of a personal computer, laptop computer, smart phone, etc.), saving a media file of the subset as a wallpaper of a means for viewing media files (e.g., a display, such as a television display, a display of a personal computer, laptop computer, smart phone, etc.), or associating a media file of the subset with a contact of the user.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
    accessing, by one or more computing devices, at least one of behavior data of a user indicating user interactions associated with individual media files in a set of media files or social data associated with one or more media files of the set of media files;
    ranking, by the one or more computing devices, the one or more media files of the set of media files based on at least one of the behavior data or the social data;
    receiving a user input representing a request to perform an action with the one or more media files in the set of media files;
    selecting, by the one or more computing devices, a number of highest ranking media files of the set of media files in response to the user input requesting to perform the action with the media in the set of media files;
    determining whether the action indicated by the user input represents a user selection of the number of highest ranking media files of the set of media files;
    in accordance with a determination that the action indicated by the user input does not represent a user selection of the number of highest ranking media files of the set of media files, performing, by the one or more computing devices, the action on the number of the highest ranking media files; and
    in accordance with a determination that the action indicated by the user input represents a user selection of the number of highest ranking media files of the set of media files:
        presenting the number of highest ranking media files for selection;
        receiving another input representing a selection of a subset of the number of highest ranking media files; and
        performing, by the one or more computing devices, the action on the subset of the number of the highest ranking media files.

2. The method of claim 1, further comprising causing representations of a first media file and a second media file in the set of media files to be presented on a viewing device in an order based at least in part on the ranking.

3. The method of claim 1, wherein a first media file in the set of media files is ranked higher than a second media file in the set of media files, and causing a representation of the first media file to be presented on a viewing device for selection in performing a third action with the first media file.

4. The method of claim 1, wherein the first action or the second action includes at least one of sharing the first number or the second number of the highest ranking media files over a network to a computing device that is remote from the client device, printing the first number or the second number of the highest ranking media files, saving the first number or the second number of the highest ranking media files as a wallpaper for the client device, or associating the first number or the second number of the highest ranking media files with a contact of the user on the client device.

5. The method of claim 1, further comprising:
    identifying the user;
    analyzing past behaviors of the user to determine a user preference for a first user behavior over a second user behavior; and
    assigning, without user intervention, a first weight to the first user behavior and a second weight to the second user behavior based at least in part on the user preference, the first weight being higher than the second weight,
    wherein the ranking is further based at least in part on the first weight and the second weight.

6. One or more computer-readable storage media comprising memory storing a plurality of programming instructions that are executable by one or more processors of a computing device to cause the computing device to perform acts comprising:
    accessing at least one of behavior data of a user indicating user interactions associated with individual media files in a collection of media files or social data associated with one or more media files of the set of media files;
    ranking the one or more media files of the collection of media files based on at least one of the behavior data or the social data;
    receiving an indication of first user input requesting to perform a action with one or more media files in the collection of media files;
    selecting a number of highest ranking media files of the collection of media files, the number being determined based at least in part on the action;
    determining whether the action indicated by the first user input represents a user selection of the number of highest ranking media files of the collection of media files;
    in accordance with a determination that the action indicated by the first user input does not represent a user selection of the number of highest ranking media files of the collection of media files, performing the action on the number of the highest ranking media files;
    in accordance with a determination that the action indicated by the first user input represents a user selection of the number of highest ranking media files of the collection of media files:
        presenting the number of highest ranking media files for selection;
        receiving another user input representing a selection of a subset of the number of highest ranking media files; and
        performing the action on the subset of the number of the highest ranking media files.

7. The one or more computer-readable storage media of claim 6,
    wherein the determining that the copies of the one or more media files were
    shared to the website of the media file sharing service further comprises:

comparing information associated with individual media files on the website to information associated with the individual media files in the collection of media files; and identifying the copies of the one or more media files based at least in part on the comparing.

8. The one or more computer-readable storage media of claim 7, further comprising:

obtaining the social data from the media file sharing service; and associating the social data with the one or more media files of the collection of media files prior to the accessing the social data.

9. The one or more computer-readable storage media of claim 6, further comprising tracking interactions of the user with the individual media files in the collection of media files to obtain the behavior data prior to the accessing the behavior data.

10. The one or more computer-readable storage media of claim 7, wherein the information associated with the individual media files on the website comprises a code derived from a feature vector generated for the individual media files on the website, and wherein the comparing utilizes a duplicate detection algorithm based on the code.

11. The one or more computer-readable storage media of claim 7, wherein the information associated with the individual media files on the website comprises at least one of a camera serial number, time information, or geolocation information.

12. The one or more computer-readable storage media of claim 6, further comprising receiving user consent to access a profile of the user for obtaining the social data.

13. The one or more computer-readable storage media of claim 6, the acts further comprising:

identifying the user;

analyzing past behaviors of the user to determine a user preference for a first user behavior over a second user behavior; and assigning, without user intervention, a first weight to the first user behavior and a second weight to the second user behavior based at least in part on the user preference, the first weight being higher than the second weight, wherein the ranking is further based at least in part on the first weight and the second weight.

14. A system comprising:

one or more processors; and memory storing computer-executable instructions that, when executed by the one or more processors, cause the one or more processors to perform acts comprising:

accessing at least one of behavior data of a user indicating user interactions associated with individual media files in a set of media files or social data associated with one or more media files of the set of media files;

ranking the one or more media files of the set of media files based on at least one of the behavior data or the social data;

receiving an indication of first user input requesting to perform an action with the one or more media files in the set of media files;

selecting a number of highest ranking media files of the set of media files, the number being determined based at least in part on the action;

determining whether the action indicated by the first user input represents a user selection of the number of highest ranking media files of the set of media files;

in accordance with a determination that the action indicated by the first user input does not represent a user selection of the number of highest ranking media files of the set of media files, performing the action on the number of the highest ranking media files;

in accordance with a determination that the action indicated by the first user input represents a user selection of the number of highest ranking media files of the set of media files:

presenting the number of highest ranking media files for selection;

receiving another user input representing a selection of a subset of the number of highest ranking media files; and performing the action on the subset of the number of the highest ranking media files.

15. The system of claim 14, wherein the behavior data includes data regarding interactions of the user with the individual media files in the set of media files.

16. The system of claim 14, wherein the social data includes one or more of social approval or disapproval data regarding the one or more media files, comment data regarding the one or more media files, sharing data regarding the one or more media files, or viewing data regarding the one or more media files.

17. The system of claim 14, the acts further comprising causing representations of at least some media files in the set of media files to be presented based at least in part on the ranking.

18. The system of claim 14, wherein the action includes at least one of sharing the number of the highest ranking media files over a network to a remote computing device, printing the number of the highest ranking media files, initiating a slideshow presentation of the number of the highest ranking media files, presenting the number of the highest ranking media files as live tiles on a viewing device, saving the number of the highest ranking media files as a wallpaper of the viewing device, or associating the number of the highest ranking media files with a contact of the user.

19. The system of claim 14, the acts further comprising: identifying the user;

analyzing past behaviors of the user to determine a user preference for a first user behavior over a second user behavior; and assigning, without user intervention, a first weight to the first user behavior and a second weight to the second user behavior based at least in part on the user preference, the first weight being higher than the second weight, wherein the ranking is further based at least in part on the first weight and the second weight.

20. The system of claim 19, wherein the past behaviors indicate that the user performed the first user behavior (i) a greater number of times, (ii) at a higher frequency, or (iii) for a longer period of time than the second user behavior.

* * * * *